US012681910B2

(12) United States Patent
Shao

(10) Patent No.: US 12,681,910 B2
(45) Date of Patent: **\*Jul. 14, 2026**

(54) DATA MANAGEMENT METHODS AND DEVICES BASED ON INDUSTRIAL INTERNETS OF THINGS (IIOT) AND ELECTRONIC DEVICES

(71) Applicant: CHENGDU QINCHUAN IOT TECHNOLOGY CO., LTD., Chengdu (CN)

(72) Inventor: Hanshu Shao, Chengdu (CN)

(73) Assignee: CHENGDU QINCHUAN IOT TECHNOLOGY CO., LTD., Chengdu (CN)

( \* ) Notice: Subject to any disclaimer, the term of this patent is extended or adjusted under 35 U.S.C. 154(b) by 0 days.

This patent is subject to a terminal disclaimer.

(21) Appl. No.: 19/172,686

(22) Filed: Apr. 8, 2025

(65) Prior Publication Data

US 2025/0238408 A1 Jul. 24, 2025

Related U.S. Application Data

(63) Continuation of application No. 18/798,835, filed on Aug. 9, 2024, now Pat. No. 12,292,868.

(30) Foreign Application Priority Data

Jun. 27, 2024 (CN) .......................... 202410841900.2

(51) Int. Cl.
*G06F 16/215* (2019.01)
*G06F 16/28* (2019.01)

(52) U.S. Cl.
CPC .......... *G06F 16/215* (2019.01); *G06F 16/285* (2019.01)

(58) Field of Classification Search
CPC ............................ G06F 16/215; G06F 16/285
USPC ......................................................... 707/692
See application file for complete search history.

(56) References Cited

U.S. PATENT DOCUMENTS

| | | | |
|---|---|---|---|
| 8,639,653 B2 | 1/2014 | Linder | |
| 10,978,185 B2 | 4/2021 | Aagesen et al. | |
| 11,232,383 B1 | 1/2022 | Burns, Sr. et al. | |
| 2018/0024868 A1 | 1/2018 | Mehta et al. | |
| 2018/0025071 A1 | 1/2018 | Ideses et al. | |

(Continued)

*Primary Examiner* — Cam Linh T Nguyen
(74) *Attorney, Agent, or Firm* — Porus IP LLC

(57) ABSTRACT

The present disclosure provides a data management method and device based on IIoT, and an electronic device. The data management method comprises: generating a data acquisition instruction and sending the data acquisition instruction to an object platform, transmitting and storing raw data acquired by the object platform to a first general database; performing a first classification on the raw data to obtain a plurality of first data sets; storing the plurality of first data sets into a plurality of sub-databases, and transmitting and storing the plurality of first data sets to a second general database; performing a second classification on the first data sets based on function types of service sub-platforms to obtain a plurality of second data sets; and storing the plurality of second data sets into the sub-databases corresponding to different service sub-platforms based on a prioritization of the plurality of second data sets to realize data management.

19 Claims, 6 Drawing Sheets

(56)        References Cited

U.S. PATENT DOCUMENTS

2018/0113928  A1      4/2018  Oberhofer et al.
2020/0192916  A1*    6/2020  Kashiwagi ............ G06F 16/248

* cited by examiner

Classifying and tagging different raw data

520

Storing the raw data into at least one pending data bucket on different storage devices based on a result of classification and tagging

530

Generating a plurality of first data sets or a plurality of second data sets based on a plurality of pending data buckets <u>600</u>

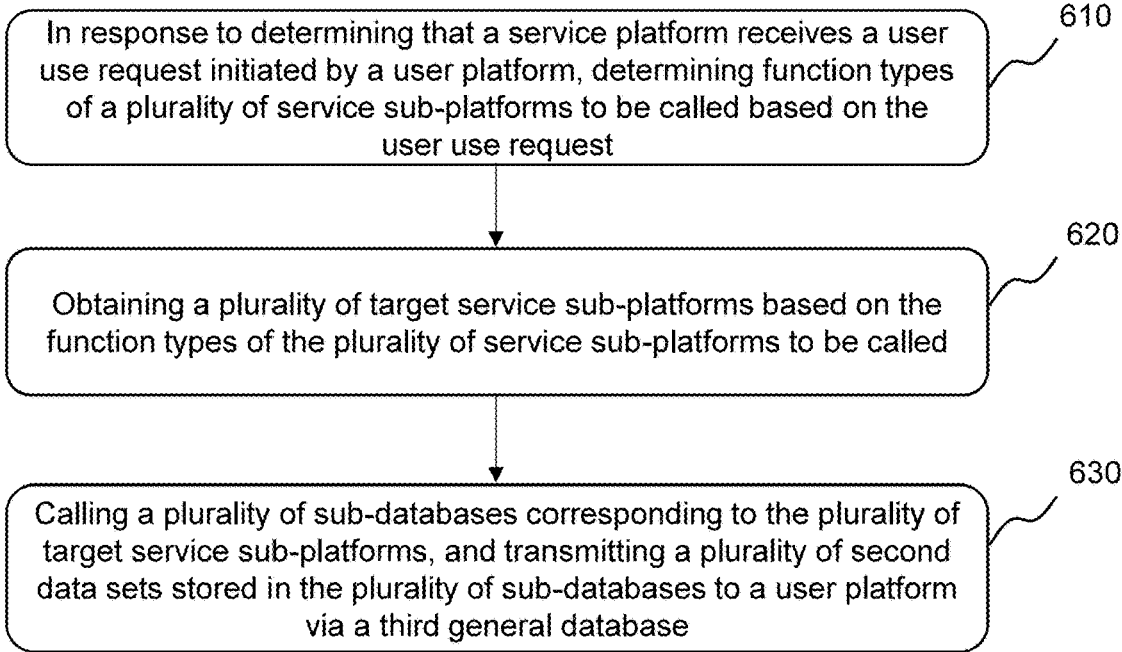

In response to determining that a service platform receives a user use request initiated by a user platform, determining function types of a plurality of service sub-platforms to be called based on the user use request                                    610

Obtaining a plurality of target service sub-platforms based on the function types of the plurality of service sub-platforms to be called          620

Calling a plurality of sub-databases corresponding to the plurality of target service sub-platforms, and transmitting a plurality of second data sets stored in the plurality of sub-databases to a user platform via a third general database                                    630

FIG. 6

DATA MANAGEMENT METHODS AND DEVICES BASED ON INDUSTRIAL INTERNETS OF THINGS (IIOT) AND ELECTRONIC DEVICES

CROSS-REFERENCE TO RELATED APPLICATION

This application is a continuation of U.S. application Ser. No. 18/798,835, field on Aug. 9, 2024, which claims priority to Chinese Patent Application No. 202410841900.2, filed on Jun. 27, 2024, the entire contents of each of which are hereby incorporated by reference.

TECHNICAL FIELD

The present disclosure relates to a technical field of data management, and in particular to data management methods and devices based on Industrial Internets of Things (IIoT) and electronic devices.

BACKGROUND

The Industrial Internets of Things (IoT) operational architecture includes an IoT information architecture, a physical architecture, and a functional architecture. The functional architecture is the external function embodiment of the information system supported by the physical system, which is a five-platform structure, including a user platform, a service platform, a management platform, a sensor network platform, and an object platform, corresponding to the user, service, sensor, and object domains in the information architecture and the user, service, management, sensor network and object layers in the physical architecture, respectively.

Existing IIoT data storage and processing are centralized in the management platform, resulting in poor data management, high pressure on data processing of the management system, which in turn causes easy collapse of the system. Especially in the context of big data, massive amounts of data are generated in industrial production, leading to further amplification of the above problems.

Therefore, a data management method and device based on the IIoT and an electronic device are provided, which are capable of efficiently managing the data and reducing the data management pressure of the management platform, thereby realizing efficient data calling, and improving the user experience.

SUMMARY

One or more embodiments of the present disclosure provide a data management method based on an IIoT, applied to the IIoT. The IIoT may include a user platform, a service platform, a management platform, a sensor network platform, and an object platform connected in sequence. The sensor network platform may include a first general database and a plurality of sensor network sub-platforms. A sub-database may be configured in each of the plurality of sensor network sub-platforms, respectively. The plurality of sensor network sub-platforms may interact with the first general database. The management platform may include a second general database and a plurality of management sub-platforms. The second general database may interact with the plurality of sensor network sub-platforms and the plurality of management sub-platforms. The service platform may include a third general database, a plurality of sub-databases, and a plurality of service sub-platforms. The third general database may interact with the user platform. The third general database may interact with the second general database through the plurality of sub-databases. The plurality of sub-databases may interact with one service sub-platform, respectively. The data management method may be performed by the management platform, comprising: generating a data acquisition instruction and sending the data acquisition instruction to a data acquisition device and a monitoring device in the object platform, and transmitting and storing raw data acquired by the object platform to a first general database in the sensor network platform via the sensor network platform; wherein the data acquisition instruction may be configured to acquire the raw data in different production processes, and the data acquisition device and the monitoring device may be respectively set on production equipment corresponding to the different production processes; generating a first classification instruction based on a data type of the raw data and sending the first classification instruction to the first general database, the first classification instruction being configured to instruct the first general database to perform a first classification on the raw data to obtain a plurality of first data sets; sending a first storage instruction to the first general database, the first storage instruction being configured to instruct the first general database to store the plurality of first data sets into the plurality of sub-databases configured in the sensor network platform, respectively, and transmitting and storing the plurality of first data sets to a second general database in the management platform via sensor network sub-platforms corresponding to the plurality of sub-databases, respectively, wherein storage capacities of different sub-databases are determined based on the different production processes; generating a second classification instruction based on function types of a plurality of service sub-platforms in the service platform, the second classification instruction being configured to instruct the second general database to perform a second classification on the raw data in the plurality of first data sets to obtain a plurality of second data sets; generating a second storage instruction based on a prioritization of the plurality of second data sets, the second storage instruction being configured to instruct the second general database to store the plurality of second data sets into the sub-databases corresponding to different service sub-platforms, and the sub-databases being used for the service sub-platforms to call the plurality of second data sets stored therein when the service platform receives a use request initiated by the user platform; in response to existence of a data management demand, sending a data management instruction to the sub-databases corresponding to different service sub-platforms to realize data management, the data management including at least one of data processing order division, data verification, junk data cleaning; and in response to completion of the junk data cleaning, issuing an adjustment instruction to adjust a monitoring frequency of the monitoring device and/or an acquisition frequency of the data acquisition device.

One or more embodiments of the present disclosure provides a data management device based on an IIoT, applied to the IIoT. The IIoT may include a user platform, a service platform, a management platform, a sensor network platform, and an object platform connected in sequence. The sensor network platform may include a first general database and a plurality of sensor network sub-platforms. A sub-database may be configured in each of the plurality of sensor network sub-platforms, respectively. The plurality of sensor network sub-platforms may interact with the first general database. The management platform may include a second general database and a plurality of management sub-platforms. The second general database may interact with the plurality of sensor network sub-platforms and the plurality of management sub-platforms. The service platform may include a third general database, a plurality of sub-databases, and a plurality of service sub-platforms. The third general database may interact with the user platform. The third general database may interact with the second general database through the plurality of sub-databases. The plurality of sub-databases may interact with one service sub-platform, respectively. The data management device may comprise: a first storage module, configured to generate a data acquisition instruction and send the data acquisition instruction to a data acquisition device and a monitoring device in the object platform, and transmit and store raw data acquired by the object platform to a first general database in the sensor network platform via the sensor network platform; wherein the data acquisition instruction may be configured to acquire the raw data in different production processes, and the data acquisition device and the monitoring device may be respectively set on production equipment corresponding to the different production processes; a first classification module, configured to generate a first classification instruction based on a data type of the raw data and send the first classification instruction to the first general database, the first classification instruction being configured to instruct the first general database to perform a first classification on the raw data to obtain a plurality of first data sets; a second storage module, configured to send a first storage instruction to the first general database, the first storage instruction being configured to instruct the first general database to store the plurality of first data sets into the plurality of sub-databases configured in the sensor network platform, respectively, and transmit and store the plurality of first data sets to a second general database in the management platform via sensor network sub-platforms corresponding to the plurality of sub-databases, respectively, wherein storage capacities of different sub-databases may be determined based on the different production processes; a second classification module, configured to generate a second classification instruction based on function types of a plurality of service sub-platforms in the service platform, the second classification instruction being configured to instruct the second general database to perform a second classification on the raw data in the plurality of first data sets to obtain a plurality of second data sets; a third storage module, configured to generate a second storage instruction based on a prioritization of the plurality of second data sets, the second storage instruction being configured to instruct the second general database to store the plurality of second data sets into the sub-databases corresponding to different service sub-platforms, and the sub-databases being used for the service sub-platforms to call the plurality of second data sets stored therein when the service platform receives a user use request initiated by the user platform; a management module, configured to send, in response to existence of a data management demand, a data management instruction to the sub-databases corresponding to different service sub-platforms to realize data management, the data management including at least one of data processing order division, data verification, junk data cleaning; and an adjustment module, configured to issue, in response to completion of the junk data cleaning, an adjustment instruction to adjust a monitoring frequency of the monitoring device and/or an acquisition frequency of the data acquisition device.

One or more embodiments of the present disclosure provide an electronic device. The electronic device may comprise a processor and a storage device. The storage device may be configured to store computer programs. The processor may be configured to load and execute the computer programs to cause the electronic device to perform the data management method based on the IIoT as described in claims.

Some embodiments of the present disclosure include at least the following beneficial effect: by setting both the sensor network platform and the management platform in the form of the general database and the sub-platforms, such that the raw data acquired by the object platform can be classified and processed at the sensor network platform to share the processing pressure of the management platform, and the classified data sets are stored separately through respective sub-databases and transmitted through the corresponding sensor network sub-platform, thereby ensuring the efficiency of data transmission. In order to match the sub-platform form of the service platform, the data sets are classified again in the second general database by the function types of the service sub-platforms, and are assigned to be stored in the sub-databases of the service sub-platforms of the corresponding functions, such that highly efficient data calling can be realized in case of a demand for interaction. In addition, part of the data management is configured to the sensor network platform and the service platform, thereby contributing to the stable operation of the IIoT.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein:

FIG. 2 is a schematic structural diagram illustrating an exemplary platform of data management of IIoT according to some embodiments of the present disclosure;

FIG. 6 is a flowchart illustrating an exemplary process of calling sub-databases according to some embodiments of the present disclosure.

DETAILED DESCRIPTION

Figure 1:
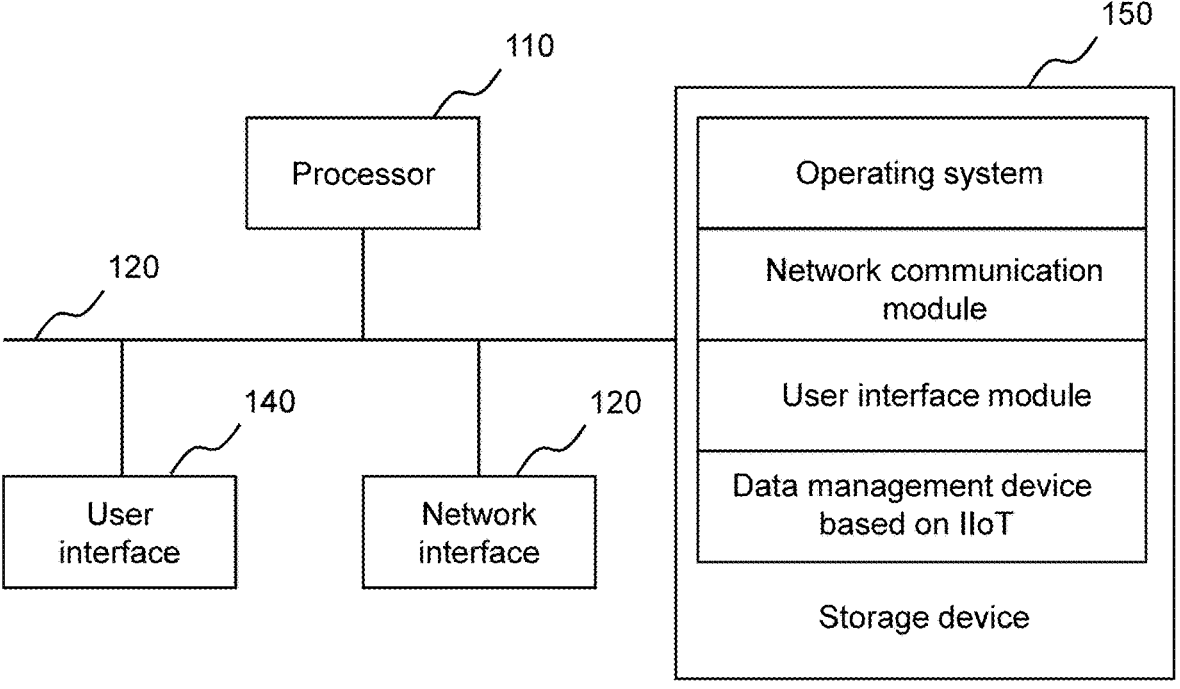
FIG. 1 is a schematic structural diagram illustrating an exemplary electronic device according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system", "device", "unit" and/or "module" used herein are a way to distinguish between different components, elements, parts, sections, or assemblies at different levels. However, the terms may be replaced by other expressions if other words accomplish the same purpose.

As shown in the present disclosure and in the claims, unless the context clearly suggests an exception, the words "one", "a", "an", "one kind", and/or "the" do not refer specifically to the singular, but may also include the plural. Generally, the terms "including" and "comprising" suggest only the inclusion of clearly identified steps and elements, however, the steps and elements that do not constitute an exclusive list, and the method or apparatus may also include other steps or elements Flowcharts are used in the present disclosure to illustrate the operations performed by a system according to embodiments of the present disclosure, and the related descriptions are provided to aid in a better understanding of the magnetic resonance imaging method and/or system. It should be appreciated that the preceding or following operations are not necessarily performed in an exact sequence. Instead, steps can be processed in reverse order or simultaneously. Also, it is possible to add other operations to these processes or to remove a step or steps from these processes.

FIG. 1 is a schematic structural diagram illustrating an exemplary an electronic device according to some embodiments of the present disclosure. As shown in FIG. 1, an electronic device 100 may include a processor 110, a communication bus 120, a network interface 130, a user interface 140, a storage device 150, or the like.

The processor 110 refers to a device for processing information that can perform functions of a data management system based on IIoT. The processor 110 may be configured to process data and/or information obtained from other devices or system components. The processor 110 may be configured to execute program instructions based on the data, information, and/or processing results to perform one or more of the functions described in the present disclosure. In some embodiments, the processor 110 may include a central processing unit (CPU), an application specific integrated circuit (ASIC), an application specific instruction-set processor (ASIP), a graphics processing unit (GPU), a physical processing unit (PPU), a digital signal processor (DSP), a field programmable gate array (FPGA), a programmable logic device (PLD), a controller, a microcontroller unit, a reduced instruction set computer (RISC), a microprocessor, or the like, or any combination thereof.

The communication bus 120 refers to a common communication trunk for transmitting information between various functional components. In some embodiments, the user interface 140, the processor 110, the network interface 130, the storage device 150, or the like may be connected to the communication bus 120.

The network interface 130 refers to an interface via which a device connects to a network to exchange information and/or data. The network interface 130 enables the components to communicate with each other and with other parts outside the system, facilitating data and/or information exchange. Optionally, the network interface 130 may include a standard wired interface, a wireless interface (e.g., a Wireless-Fidelity (Wi-Fi) interface).

The user interface 140 refers to an interface for interaction and exchange of information between a user and the data management system of the IIoT. In some embodiments, the user interface 140 may be a device used by the user to use the data management system based on the IIoT. For example, the user interface 140 may include a display, an input unit, such as a keyboard. Optionally, the user interfaces 140 may also include a standard wired interface, a wireless interface, or the like.

The storage device 150 may be configured to store data, instructions, and/or any other information. In some embodiments, the storage device 150 may be configured to store data and/or information during processing of a processing device, or information related to software and device, or the like. In some embodiments, the storage device 150 may include a random-access memory (RAM), a read-only memory (ROM), a mass memory, a removable memory, a volatile read/write memory, or the like, or any combination thereof.

As shown in FIG. 1, the storage device 150 may include an operating system, a network communication module, a user interface module and a data management device based on the IIoT.

In the electronic device 100 shown in FIG. 1, the network interface 130 may be mainly configured to perform data communication with a network server; the user interface 140 may be mainly configured to perform data interaction with the user; and the processor 110 and the storage device 150 may be provided in the electronic device 100. The electronic device 100 may calls the data management device based on the IIoT stored in the storage device 150 via the processor 110 and execute the data management method based on the IIoT provided by the embodiments of the present disclosure.

In some embodiments of present disclosure, the data management system based on the IIoT can be operated coordinately and regularly under the unified management of the processor, and manage the data of the IIoT efficiently, which can reduce the pressure on the data management of the management platform, and facilitate the stable operation of the IIoT.

It is understood by those skilled in the art that the structure illustrated in FIG. 1 does not constitute a limitation of the electronic device, and the electronic device may include more or fewer components than illustrated, or combinations of certain components, or different arrangements of components.

Figure 2:
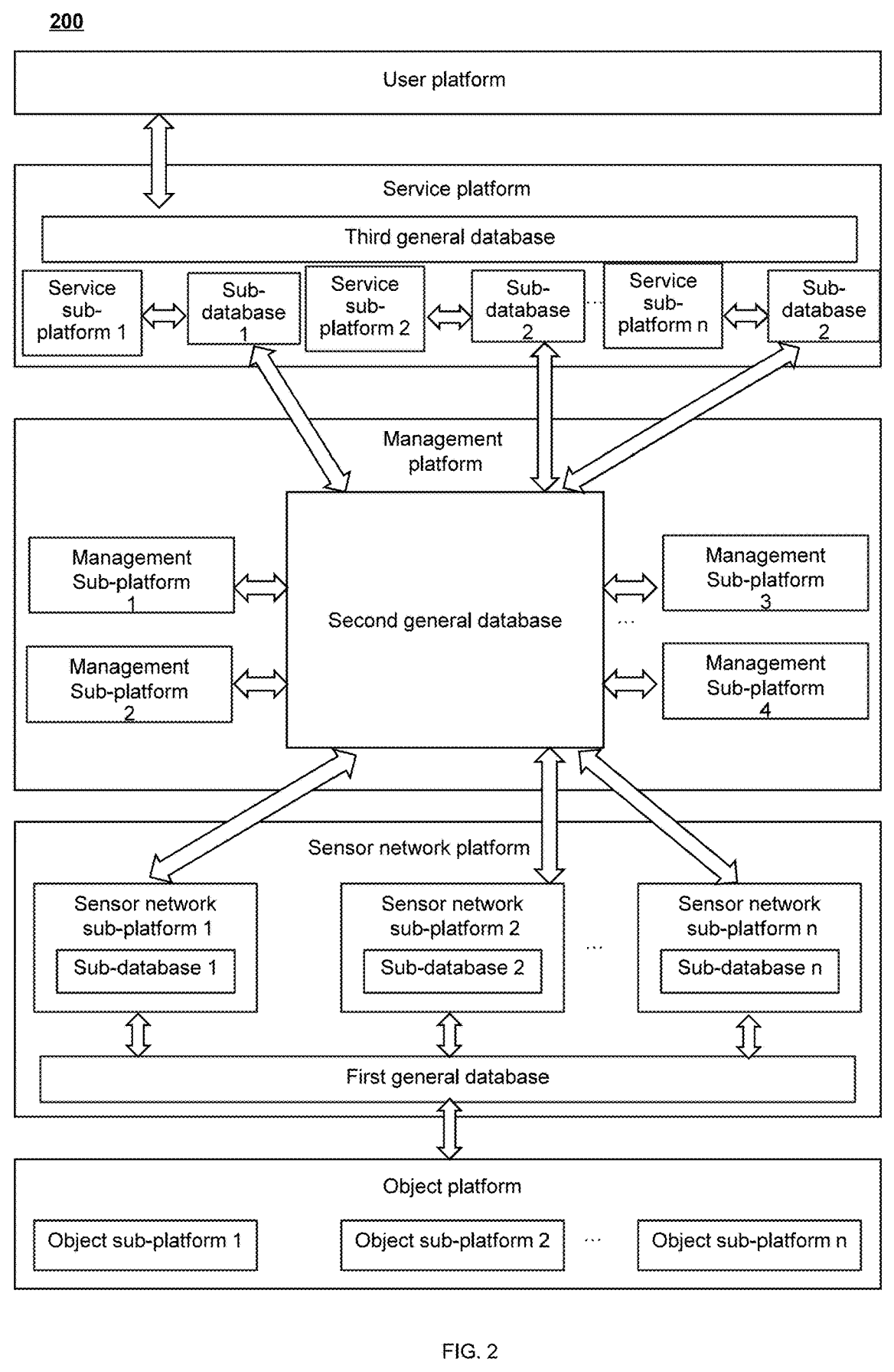

FIG. 2 is a schematic structural diagram illustrating an exemplary IIoT according to some embodiments of the present disclosure.

As shown in FIG. 2, IIoT 200 may include a user platform, a service platform, a management platform, a sensor network platform, an object platform, or the like.

The user platform refers to a platform for interacting with a user. In some embodiments, the user platform may be configured as a terminal device. In some embodiments, a physical entity of the user platform may include various user terminals, such as a cell phone, a computer, a dedicated terminal, or the like, which realizes the services on the user side through the combination with user information system software.

The service platform refers to a platform that provides services to the user. The service platform is user-oriented and independent of the management platform. The service platform may provide user service demand calculation to form a service-related database.

In some embodiments, the service platform may include a third general database, a plurality of service sub-platforms, and a plurality of sub-databases corresponding to the plurality of service sub-platforms. The service platform may communicate and/or exchange data with the management platform.

The third general database refers to a database used to store data in the service platform. For example, the third general database may be configured to store data transmitted and interacted between the service platform and the user platform. The third general database may be configured to interact with the user platform, and interact with a second general database via the plurality of sub-databases.

The plurality of service sub-platforms refer to a plurality of sub-platforms that processes a user command initiated by the user platform. The plurality of service sub-platforms may interact with the plurality of sub-databases corresponding to plurality of service sub-platforms.

The plurality of sub-databases may be configured to store data transmitted from the second general database in the management platform. The plurality of sub-databases may be configured to communicate and/or exchange data with the second general database. For example, the plurality of sub-databases may be configured to store a plurality of second data sets obtained after a second classification is performed in the second general database.

The management platform refers to an operation and coordination platform of the IoT. In some embodiments, the management platform may include a plurality of management sub-platforms and the second general database (i.e., a data center). Different management sub-platforms may perform different management operations. The data center may be configured to store various types of management data of the system.

The second general database refers to a database used to store data in the management platform. The second general database may be configured to communicate and/or exchange data with the sensor network platform and the plurality of management sub-platforms. For example, the second general database store a plurality of first data sets transmitted by a plurality of sensor network sub-platforms. As another example, the second general database may receive and store data after data management is performed in the plurality of management sub-platforms.

The plurality of management sub-platforms refer to sub-platforms that perform business management in the IIoT. The plurality of management sub-platforms may be configured to communicate and/or exchange data with the second general database.

The sensor network platform refers to a functional platform for managing sensor communication. The sensor network platform may provide functions such as communication transmission, analysis, tagging, classification of data, etc., avoiding redundant data in the management platform, and inefficient data processing caused by various types of object platform data being directly aggregated in the management platform.

In some embodiments, the sensor network platform may include the first general database and the plurality of sensor network sub-platforms.

The first general database refers to a database configured in the sensor network platform for storing data. For example, the first general database may be configured to store raw data acquired by the object platform.

The first general database may communicate and/or exchange data with the plurality of sub-databases configured in the object platform and the plurality of sensor network sub-platform, respectively.

The plurality of sensor network sub-platforms refer to sub-platforms that manage sensor communication. The plurality of sensor network sub-platforms may be configured with a plurality of sub-databases. The plurality of sub-databases may be configured to store the first data set obtained after the first classification.

The object platform refers to a functional platform for perceptional information generation and control information execution. The object platform may be configured to realize the corresponding information perception and provide the information perception to a perception service demand of the user.

In some embodiments, the object platform may include a plurality of object sub-platforms.

In some embodiments, the plurality of object sub-platforms may include various types of devices in the data management system based on the IIoT.

In some embodiments of the present disclosure, the data management system based on the IIoT can form a closed loop of information operation between the object platform and the user platform, and operate coordinately and regularly under the unified management of the management platform, so as to realize efficient and standardized data management.

Figure 3:
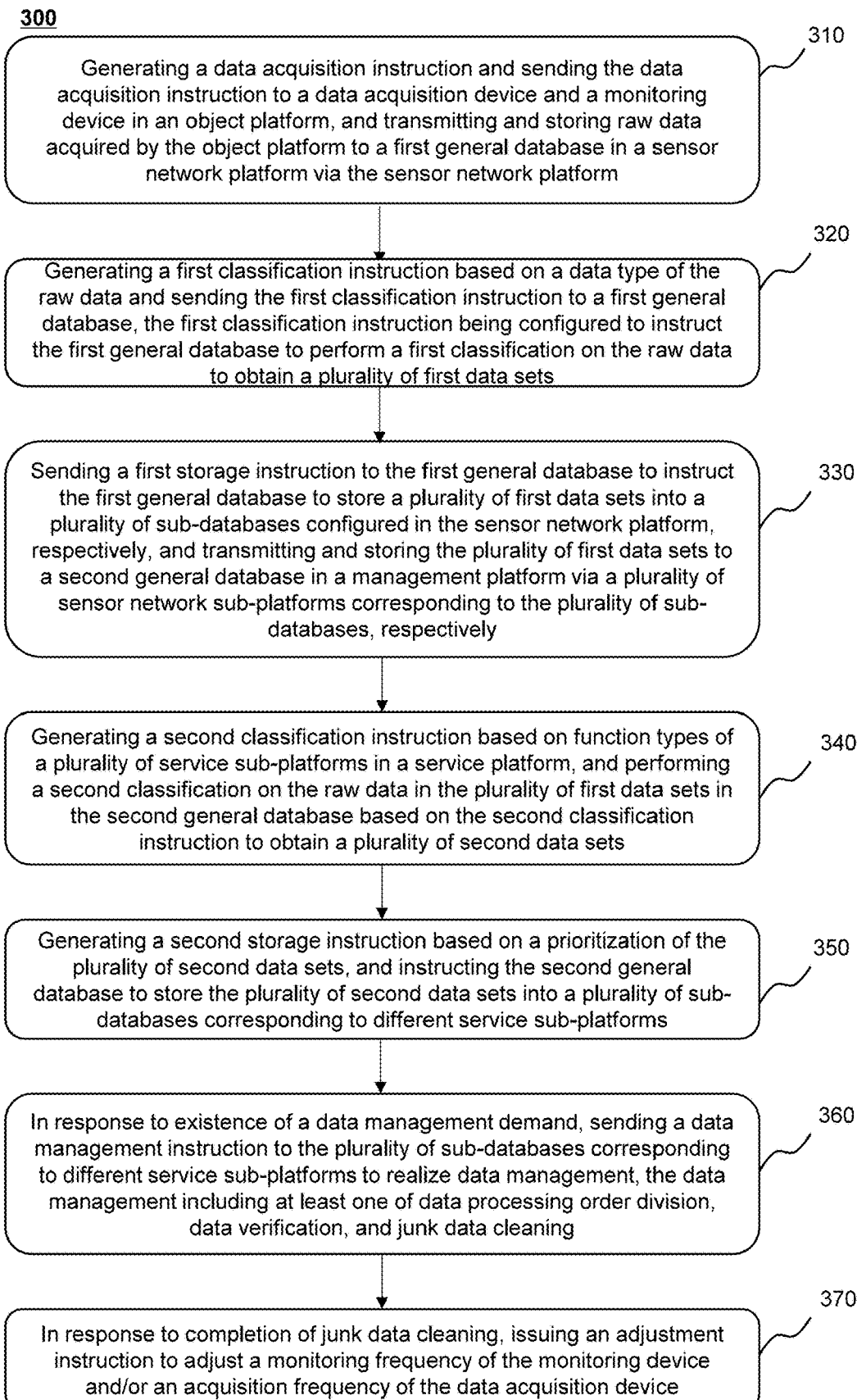
FIG. 3 is a flowchart illustrating an exemplary data management method based on IIoT according to some embodiments of the present disclosure.

FIG. 3 is a flowchart illustrating an exemplary data management method based on IIoT according to some embodiments of the present disclosure. As shown in FIG. 3, a process 300 may include the following operations. In some embodiments, the process 300 may be performed by a management platform.

In 310, a data acquisition instruction may be generated and sent to a data acquisition device and a monitoring device in an object platform, and raw data acquired by the object platform may be transmitted and stored to a first general database in a sensor network platform via the sensor network platform.

The data acquisition instruction may be configured to instruct the data acquisition device and the monitoring device to perform data acquisition. For example, the data acquisition instruction may be acquiring temperature data of a particular production process (e.g., a melting process), or the like.

In some embodiments, the management platform may periodically generate the data acquisition instruction and send the data acquisition instruction to the data acquisition device and the monitoring device in the object platform after production begins.

The raw data refers to data acquired by the data acquisition device and the monitoring device. For example, the raw data may include temperature data, humidity data, production data, quality data, energy consumption data, or the like.

In some embodiments, in response to the data acquisition instruction, the data acquisition device and the monitoring device may acquire the raw data and transmit and store the raw data to the first general database via the sensor network platform.

The data acquisition device may be configured to acquire data related to a production environment. For example, the data acquisition device may include a temperature sensor, a humidity sensor, a pressure sensor, or the like.

The monitoring device may be configured to acquire data related to the production process. For example, the monitoring device may include a production detection device such as a weight detection device, a metal detection device, or the like.

In some embodiments, the data acquisition device and the monitoring device may be respectively set on production equipment corresponding to different production processes for acquiring the raw data related to the different production processes or different production equipment.

In a specific implementation process, the object platform may be configured to access a device used for data acquisition (e.g., the data acquisition devices and the monitoring device) to enable a physical entity to access the IIoT. For example, the object platform may be configured to access the temperature sensor, humidity sensor, or the like. The temperature sensor may be configured to acquire temperature of a production plant. The humidity sensor may be configured to acquire humidity of the production plant. As another example, the object platform may be configured to access the production detection device. The production detection device may be configured to acquire data such as production data, quality data, energy consumption data, or the like. The object platform may be configured in the form of a plurality of object sub-platforms, as shown in FIG. 2, for accessing a plurality of same or different devices configured to acquire data. The data acquired by the accessed devices may all be regarded as the raw data, which may be stored in the first general database of the sensor network platform, thereby avoiding drastic increase in the processing load of the management platform caused by a large amount of data directly pouring into the management platform for processing. More descriptions regarding the object platform may be found in FIG. 2 and related descriptions thereof.

The production equipment refers to equipment that needs to be used in the production process of a product. The production equipment needed to produce different products may be different. For example, when an injection molded component is produced, the production equipment may include an injection device, a mold closing device, or the like. The injection device may be configured to melt and inject a raw material into a mold. The mold closing device may be configured to close the mold. The descriptions regarding the production equipment are for illustrative purposes only and are not intended to limit the scope of the present disclosure.

The production processes may include a plurality of production steps. The production processes may be different for different products. Taking the production processes of an injection molded component as an example, the production processes may include a plurality of production steps such as mixing (mixing the raw material required for injection molding), melting (melting the mixed raw material at the preset temperature), injection molding (injecting the raw material in a fluid state into the mold), cooling and curing (cooling down the raw material for molding), demolding and post-processing (demolding and taking out the injected product), etc.

In 320, a first classification instruction may be generated based on a data type of the raw data and sent to a first general database, the first classification instruction being configured to instruct the first general database to perform a first classification on the raw data to obtain a plurality of first data sets.

In some embodiments, the data type of the raw data may be classified according to a data storage format. For example, the data type may include a text type. The text type may be used to represent a data representation of words and characters, typically used to represent a document, a description, a label, or the like. The data type may also include an image type. The mage type may be two-dimensional image data consisting of pixels, such as a temperature distribution map of sensor feedback. The data type may also include a table type. The table type may be a two-dimensional structure that organizes the data into rows and columns, and may be typically used to represent structured data, such as a spreadsheet, a database table, or the like. The data types may also include other specific types, such as time series data, audio data, video data, or the like.

In some embodiments, the data type of the raw data may be classified according to a monitoring object. For example, the data type may include monitoring data, an equipment operating parameter, an environmental parameter, a detection parameter, or the like.

The monitoring data refers to data obtained by monitoring the production process. For example, data on a quality change in the production process may belong to the monitoring data.

The equipment operating parameter refers to a parameter of the production equipment during operation. For example, raw data related to an equipment log, or the like, may belong to the equipment operating parameter.

The environmental parameter refers to parameter related to an environment during production. For example, raw data related to the environmental temperature, the environmental humidity, or the like, may belong to the environmental parameter.

The detection parameter refers to a parameter obtained by detecting the production equipment, a product, a material, or the like. For example, raw data related to an appearance quality, a dimensional accuracy, a material composition, or the like of the product, may belong to the detection parameter.

The first classification instruction refers to an instruction for instructing the first general database to perform the first classification on the raw data. For example, the first classification instruction may be configured to perform the first classification on the raw data acquired during the melting process.

In some embodiments, when the raw data has more than one data type, the management platform may generate the first classification instruction and send the first classification instruction to the first general database to instruct the first general database to classify the raw data into different first data sets according to different data types.

In some embodiments, the management platform may periodically generate the first classification instruction and send the first classification instruction to the first general database. For example, the first classification instruction may be generated after the raw data of each production step is acquired.

The first data sets refer to collections of a plurality of data obtained by performing the first classification on the raw data. For example, the raw data of the text type may form a first data set, the raw data of the image type may form another first data set, or the like.

In some embodiments, the first general database may perform, in response to receiving the first classification instruction, the first classification on the raw data to obtain the plurality of first data sets.

The first classification refers to an operation for classifying the raw data according to the data type. In some embodiments, after the first classification instruction is generated based on the data type of the raw data, the first general database may directly perform the first classification on the raw data according to the first classification instruction. For example, the first classification instruction may be configured to classify data of the same data type into a data set. Accordingly, the first general database may classify THE raw data of the same data type into the same first data set. As a result, the individual raw data in the same first data set may have the same data type.

In some embodiments, after the raw data acquired by the object platform is transmitted and stored to the first general database via the sensor network platform, the management platform may also perform homological tagging on the raw data based on a degree of homology of the raw data, and obtain at least one homologous data set; instruct the first general database to perform the first classification on the raw data in each of the at least one homologous data set based on the first classification instruction to obtain the plurality of first data sets.

The degree of homology refers to a parameter used to characterize a degree of correlation between different raw data.

In some embodiments, the management platform may determine, in various ways, the degree of homology of the raw data. In some embodiments, the management platform may determine a high degree of homology of raw data having the same data type, a high degree of homology of raw data obtained from the same production process, or the like. For example, the temperature data of a server room may have a high degree of homology with the temperature data of operating equipment. As another example, the production data and the quality data acquired by the production detection device of the same production process may have a high degree of homology.

In some embodiments, the management platform may generate degrees of homology of different raw data based on a data source and a data type of the raw data.

The data source refers to a source from which the raw data is obtained. For example, the raw data may come from different production device, different data acquisition devices and monitoring devices, different procedures in different production processes, or the like. In some embodiments, after the data acquisition device and the monitoring device acquire the raw data, the raw data may be transmitted and stored, along with the data source, to the first general database via the sensor network platform.

In some embodiments, for each of the plurality of acquired raw data, the management platform may construct a raw data vector based on the data source and the data type of the raw data, and obtain a plurality of clustering centers by performing clustering on the raw data vector through a clustering algorithm. The management platform may determine at least one of the raw data vectors of which a vector distance from the clustering center is less than a first distance threshold to constitute a clustering result (i.e., a collection of clustering centers) corresponding to the clustering center. Further, the management platform may determine the degree of homology based on vector distances between the plurality of raw data vectors in the same collection of clustering centers and the clustering center, respectively. The degree of homology may be negatively correlated with the vector distance. The degree of homology may be maximum when the distance between the vectors is less than a second distance threshold. The first distance threshold may be greater than the second distance threshold. The first distance threshold and the second distance threshold may be set manually. The vector distance may be a Euclidean distance, a cosine distance, or the like. The clustering algorithm may include, but is not limited to, K-Means clustering and/or density-based clustering methods, or the like. This operation may be performed in advance.

In some embodiments of the present disclosure, the degree of homology may be determined based on the data source and data type of the raw data, such that the degree of correlation between the raw data can be more comprehensively determined.

The homologous data set refers to a collection of a plurality of raw data with a high degree of homology.

In some embodiments, the management platform may determine raw data corresponding to a plurality of raw data vectors contained in the same collection of clustering centers as the homologous data set. In some embodiments, the management platform may determine the plurality of raw data corresponding to the plurality of raw data vectors contained in the same collection of clustering centers with degrees of homology greater than a degree threshold as the homologous data set. In some embodiments, the degree threshold may be a first threshold. In some embodiments, the degree threshold may also be a second threshold. In some embodiments, the degree threshold may be a value less than the second threshold. More descriptions regarding the first threshold and the second threshold may be found in the present disclosure below.

In some embodiments, a type of homological tagging may include a primary homological tagging and a secondary homological tagging. In response to determining that the degree of homology of the raw data is greater than the first threshold, the management platform may perform the primary homological tagging on the raw data; and in response to determining that the degree of homology of the raw data is greater than the second threshold and less than the first threshold, perform the secondary homological tagging on the raw data. The first threshold and the second threshold may be set manually.

A degree of correlation between the raw data with the primary homological tagging may be higher than the degree of correlation between the raw data with the secondary homological tagging. Highly correlated raw data may be determined by the primary homological tagging, and relatively correlated raw data may be determined by the secondary homological tagging. The raw data with the degree of homology being less than the second threshold may not be highly correlated with each other, and pushing the data may not make much sense. In addition, after the degree of homology is graded, if there is more than one correlated raw data, the additionally pushed raw data may be classified and packaged in terms of the type of homological tagging. From the perspective of user, the user not only obtains the target data (i.e., the desired data), but also receives other data that are highly correlated with the target data, other data that are relatively correlated with the target data, or the like, thereby further enhancing the user experience.

In some embodiments, the management platform may obtain a primary homologous data set based on the primary homological tagging. A degree of homology of the raw data in the primary homologous data set may be greater than the first threshold.

In some embodiments, the management platform may obtain a secondary homologous data set based on the secondary homological tagging. A degree of homology of the raw data in the secondary homologous data set may be greater than the second threshold and less than the first threshold.

In some embodiments, the management platform may perform the first classification on the raw data contained in the primary homologous data set. In some embodiments, the management platform may perform the first classification on the raw data contained in the secondary homologous data set. In some embodiments, the management platform may perform the first classification on the raw data contained in the primary homologous data set and the secondary homologous data set simultaneously. The management platform may select the homologous data set for the first classification based on actual needs. For example, in order to reduce the data processing time, the management platform may choose to perform the first classification on the raw data contained in the primary homologous data set only. When the primary homologous data set contains fewer raw data, the management platform may perform the first classification on the raw data contained in the primary homologous data set and the raw data contained in the secondary homologous data set simultaneously, to improve the accuracy of data processing.

In some embodiments of the present disclosure, multi-level homological tagging of the raw data may be performed based on the degree of homology, such that the raw data with different levels of homological tagging can be separately processed in different application scenarios, and data processing is more flexible. Then the first classification is performed on the raw data based on the degree of homology, thereby improving the efficiency of data processing.

In some embodiments, in order to improve the effect of data management, when the homological tagging is performed on the raw data based on the degree of homology of the raw data, the management platform may label the raw data belonging to the same homologous data set with the same tag or set a matching number, serial number, or the like. The purpose of performing the homological tagging on the raw data is to push the homologous data that is not called to the user for reference according to the situation of homological tagging (which may also be the desired data of the user) when services are provided to the user based on the data, thereby improving the user experience.

In some embodiments, the management platform may issue the first classification instruction to the first general database to instruct the first general database to perform the first classification on the raw data contained in each of the at least one homologous data set based on the data type. For each of the at least one homologous data set, one or more first data sets corresponding to one or more data types may be obtained.

In some embodiments of the present disclosure, the first classification may be performed on the raw data based on the degree of homology, the raw data with the high degree of correlation and the same data type may be classified into the same first data set, and different processing may be performed on the data in different first data sets in the subsequent steps, which is more efficient in data processing, and is more convenient for data management.

The management platform may also perform the first classification in other ways. More descriptions regarding the first classification may be found in FIG. 4 and FIG. 5 and related descriptions thereof.

In 330, a first storage instruction may be sent to the first general database to instruct the first general database to store a plurality of first data sets into a plurality of sub-databases configured in the sensor network platform, respectively, and the plurality of first data sets may be transmitted and stored to a second general database in a management platform via a plurality of sensor network sub-platforms corresponding to the plurality of sub-databases, respectively.

The first storage instruction refers to an instruction for instructing the first general database to store the plurality of first data sets to the plurality of sub-databases and the second general database. In some embodiments, after the first general database obtains the plurality of first data sets by completing the first classification, the management platform may generate the first storage instruction and sends the first storage instruction to the first general database.

In some embodiments, each of the plurality of first data sets may correspond each of the plurality of sub-databases, and each of the plurality of sub-databases may be configured to store a first data set corresponding to a data type. In response to determining that the first storage instruction is received, the first general database may store the plurality of first data sets into the plurality of sub-databases corresponding to the plurality of first data sets, respectively.

In some embodiments, since different sub-databases may be configured to store the plurality of first data sets of different data types, the plurality of sensor network sub-platforms may transmit and store the plurality of first data sets to the second general database through a transmission mode matching the data types of the plurality of first data sets in the plurality of sub-databases.

Since the plurality of first data sets are obtained by performing data division based on the data type, the plurality of sensor network sub-platforms, when transmitting data to the management platform, may consider performing independent transmission of the plurality of first data sets in a transmission mode suitable for the corresponding data type. By performing separate and independent transmission, the pressure of data transmission may be shared, avoiding the low transmission efficiency caused by complicated data when data interaction is performed using one sensor network platform. Meanwhile, the classified and sorted first data sets may be transmitted to the management platform separately via the plurality of sensor network sub-platforms, which can store the plurality of first data sets in the second general database in a more organized manner, thereby avoiding data mixing, and facilitating data selection during interaction.

In 340, a second classification instruction may be generated based on function types of a plurality of service sub-platforms in a service platform, and a second classification may be performed on the raw data in the plurality of first data sets in the second general database based on the second classification instruction to obtain a plurality of second data sets.

In some embodiments, the function types of the plurality of service sub-platforms may be function types that the plurality of service sub-platforms are able to provide to the user.

In some embodiments, the function types of the plurality of service sub-platforms may include a notification function, a warning function, or the like. The plurality of service sub-platforms with the notification functions may send notification information to the user platform when the data is stored in the corresponding sub-databases. The notification information may include a data volume, data storage time, the data type, or the like. The plurality of service sub-platforms with the warning function may send warning information to the user platform when the data is stored in the corresponding sub-databases. The warning information may include the data volume, a warning type (e.g., presence of contamination data, presence of pending verification data, etc.), or the like. More description regarding the contamination data and the pending verification data may be found in FIG. 4, FIG. 5 and related descriptions thereof.

In some embodiments, the user may issue a user use request via the user platform, and the user platform may send the user use request to the service platform.

In some embodiments, the service platform may locate the plurality of service sub-platforms and sub-databases corresponding to the plurality of service sub-platforms based on request data in the user use request, so as to call the request data from the corresponding sub-databases through the corresponding service sub-platforms and upload the request data to the user platform via the corresponding service sub-platforms. Correspondingly, in some embodiments, the function types of the plurality of service sub-platforms may include providing the request data of a certain data type to the user. For example, the user use request may include a request for monitoring data for one or more production equipment, a request for monitoring data for production qualities of one or more products, a request for monitoring data for one or more production processes, or the like. Correspondingly, the function types of the plurality of service sub-platforms may include providing the user with the monitoring data of the production equipments, providing the user with the monitoring data of the production qualities, providing the user with the monitoring data of the production processes, or the like.

More descriptions regarding the user use request may be found in the operation 360 and related descriptions thereof.

The second classification instruction refers to an instruction for performing the second classification on the raw data in the plurality of first data sets. In some embodiments, when the function types of the plurality of service sub-platforms contained in the service platform are different, the management platform may generate the second classification instruction. In some embodiments, the management platform may generate, based on the function types of the plurality of service sub-platforms, the second classification instruction for performing the second classification on the raw data in the plurality of first data sets.

The plurality of second data sets refer to collections of data obtained by performing the second classification on the raw data contained in the plurality of first data sets.

The second classification refers to a classification of the raw data contained in the plurality of first data sets. The second classification may be performed in each of the plurality of first data sets. One set of the plurality of first data sets may be divided to obtain one or more second data sets. Through this classification mode, the distribution state of the data can be effectively avoided to be disrupted, and the data volume in each part is much less than the total data volume, which can effectively improve the efficiency of classification.

The first classification preliminarily completes the classification management of the raw data. The IIoT also has an important function of providing services to the user, so the second classification may be configured to perform reclassification on the plurality of first data sets after the first classification based on the function types of the plurality of service sub-platforms. In some embodiments, the management platform may reclassify the plurality of first data sets again based on the function types of the plurality of service sub-platforms, such as machine room monitoring, production quality monitoring, or the like, to form the plurality of second data sets. For example, if a first data set is a collection of data in the form of images, and the function types of the plurality of service sub-platforms include server room monitoring, production quality monitoring, or the like, a second data set after the second classification may include temperature distribution image data of the server room that is fed back by the temperature sensor, and another second data set may include a product image acquired by the production detection device. That is, the collection of the same data type may be reclassified based on the function type.

In some embodiments, for the first data set obtained by dividing in each pending verification data bucket, the management platform may generate a corresponding second classification instruction based on the notification function or the warning function of each of the plurality of service sub-platforms to perform the second classification on the first data set. For example, the generated second classification instruction may be that: for each first data set in each pending verification data bucket, the raw data with the highest number of occurrences of the data source may be determined as the second data set. As another example, the generated second classification instruction may be that: for each first data set in each contamination data bucket, the raw data with the highest number of occurrences of the data source may be determined as the second data set.

In 350, a second storage instruction may be generated based on a prioritization of the plurality of second data sets, and the second general database may be instructed to store the plurality of second data sets into a plurality of sub-databases corresponding to different service sub-platforms.

After the second classification is completed, in order to avoid that the plurality of second data sets stored in the management platform occupy a large amount of resources, the plurality of second data sets may be stored in the plurality of sub-databases corresponding to the plurality of service sub-platforms. In this way, after determining that the user platform initiates a use request, the corresponding service sub-platforms, i.e., the data in the sub-databases corresponding to target service sub-platforms, may be called according to functional services to be carried out for interaction, which improves the efficiency of data interaction. More descriptions regarding the target service sub-platforms may be found in FIG. 6 and related descriptions thereof.

The prioritization of the plurality of second data sets refers to a prioritization of processing the plurality of second data sets.

It is understood that there are many factors that affect the prioritization, including data urgency, data importance, data correlation, data dependency, data timeliness, user demand, etc. For example, urgent data that directly affects production safety and efficiency, such as equipment failure warning, abnormal production environment, or the like, can have the highest processing priority; important data related to production decision-making, product quality control, and other key business can have a relatively high processing priority; for the production link that requires frequent data analysis or optimization, the related data needs to have a relatively high priority; the data that needs to ensure the timeliness requirements and is not processed near the required timeliness node should have a relatively high priority; and the data that the user pays attention to more frequently or the data that the user issues the calling instruction should be given a priority for processing.

In some embodiments, the priorities of the plurality of second data sets may be related to the function types of the plurality of service sub-platforms corresponding to the plurality of second data sets. In some embodiments, the management platform may determine the data priorities corresponding to the plurality of second data sets by querying a preset table. The preset table may include a correspondence between the function types of the plurality of service sub-platforms corresponding to the plurality of second data sets and the priorities of the plurality of second data sets. The preset table may be determined based on historical experience.

In some embodiments, the management platform may evaluate the priorities of the plurality of second data sets through a priority evaluation model to obtain the prioritization of the plurality of second data sets. In some embodiments, when the prioritization of the plurality of second data sets is determined by the priority evaluation model, the management platform may input data sources, data types, data generation time of the plurality of second data sets, and a result of whether each of the plurality of second data sets includes the contamination data into the priority evaluation model. The priority evaluation model may output the prioritization of the plurality of second data sets. More descriptions regarding the priority evaluation model may be found in the operation 330 and related descriptions thereof. By analyzing the factors affecting the priorities of the plurality of second data sets as a whole through the priority evaluation model, the prioritization of the plurality of second data sets can be accurately output and the plurality of second data sets can be processed in sequence according to the prioritization.

In some embodiments, the management platform may update the priorities of the plurality of second data sets in real time as the second general database processes the plurality of second data sets. The manner of updating the priority may be the same as determining the priority, which is not repeated here.

In some embodiments of the present disclosure, the prioritization of the plurality of second data sets determined by the priority evaluation model is more accurate.

In some embodiments, the management platform may process the plurality of second data sets in sequence according to the prioritization of the plurality of second data sets, and store a plurality of processed second data sets into the plurality of sub-databases corresponding to different service sub-platforms, respectively, for data management. More descriptions regarding data processing and data management may be found in the operation 360 and related descriptions thereof.

In some embodiments, in the process of data management of the plurality of second data sets by the second general database: when a pending second data set of a higher priority exists in the second general database, the management platform may abort a processing task of the current second data set based on a preemptive scheduling algorithm and assign a processor to prioritize the processing of the pending second data set of the higher priority.

The preemptive scheduling algorithm refers to an algorithm used to manage processes of the processor. The preemptive scheduling algorithm may include a preemptive shortest job priority algorithm, a preemptive priority scheduling algorithm, or the like. In some embodiments, when the second general database processes the processing task of the current second data set, the second general database may provide feedback to the management platform if a pending second data set of a higher priority than the priority of the current second data set exists. Further, the management platform may abort the processing task of the current second data set and prioritize the processing task of the pending second data set of the highest priority.

In some embodiments of the present disclosure, by processing the plurality of second data sets based on the priority, the data with higher priority can be processed preferentially, which can meet the requirements of urgent operation.

The second storage instruction refers to an instruction for instructing the second general database to store the plurality of second data sets into the plurality of sub-databases.

In some embodiments, the management platform may generate, based on the prioritization of the plurality of second data sets, a second storage instruction for storing the plurality of second data sets into the corresponding sub-databases in sequence according to the prioritization. In some embodiments, the plurality of sub-databases included in the service platform may be preset with processing priorities, and the sub-database with a higher processing priority may be able to prioritize more the processing of the data stored therein. In some embodiments, the management platform may match the second data set with a higher priority to the sub-database with a higher processing priority based on the prioritization of the plurality of second data sets and the processing priorities of the plurality of sub-databases. After the plurality of second data sets match with the plurality of sub-databases one by one, the second storage instruction for storing the plurality of second data sets into the corresponding matched sub-databases in sequence may be obtained.

In some embodiments, in response to determining that the second storage instruction is received, the second general database may store the plurality of second data sets into the sub-databases corresponding to the plurality of service sub-platforms in sequence, respectively, based on the prioritization. By storing the plurality of second data sets into the plurality of sub-databases, after determining that the user platform initiates the use request, the corresponding service sub-platform, i.e., the data in corresponding sub-database of the target service sub-platforms, may be called according to the functional services to be carried out for interaction, which improves the efficiency of data interaction.

In 360, in response to existence of a data management demand, a data management instruction may be sent to the plurality of sub-databases corresponding to different service sub-platforms to realize data management, the data management including at least one of data processing order division, data verification, and junk data cleaning.

The data management demand refers to a demand for data management. The data management demand may include a user use request, a device detection request, or the like.

The user use request refers to a request for the user for data management. For example, the user use request may be viewing certain data, or the like. The user use request may be obtained by inputting in the user platform by the user.

The device detection request refers to a request for data management when device detection is performed.

In some embodiments, the device detection may include one or more of storage device occupancy detection, storage device content detection, network transmission device rate detection, or the like.

The storage device occupancy detection refers to detecting the capacity occupancy of storage devices corresponding to the plurality of sub-databases. The storage device content detection refers to detecting the storage data content of the storage devices corresponding to the plurality of sub-databases. The network transmission device rate detection refers to detecting the transmission speed of network transmission devices corresponding to different sensor network sub-platforms.

In some embodiments, the management platform may determine the device detection request based on a preset detection period. The detection periods corresponding to different types of device detection requests may or may not be the same. The detection period may be a human preset value, a system default value, or the like. In some embodiments, the device detection request may also be initiated by inputting in the user platform by the user.

The data management instruction refers to an instruction configured to realize data management. For example, the data management instruction may be performing junk data cleaning, or the like.

In some embodiments, the data management instruction may include the content and location of the data management. The content of the data management may include viewing data, the storage device occupancy detection, the storage device content detection, the network transmission device rate detection, or the like. An object of the data management may be a sub-database that performs the data management.

In some embodiments, the data management instruction may be related to the data management demand. For example, a correspondence between different data management demands and different data management instructions may be preset. When the data management demand is determined or received, the data management instruction corresponding to the data management demand may be generated based on the correspondence.

The data management refers to the process of efficient data collection, storage, processing and application. In some embodiments, the data management may include at least one of the data processing order division, the data verification, and junk data cleaning.

The data processing order division refers to determining an order in which the data is processed.

In some embodiments, the management platform may perform the data processing order division in different sub-databases based on the prioritization of the plurality of second data sets, respectively. For example, the management platform may compare the priorities of the plurality of second data sets stored in the same sub-database, and sort the plurality of second data sets in order of priority to determine the data processing order.

The data verification refers to verification of a data set that may have problems. The data verification may include verification of problems of the data or problems of the production equipment, the data acquisition device, and the monitoring device to which the data corresponds, etc. The data verification may also include verifying whether the data is related to an equipment failure.

In some embodiments, the management platform may verify the data in a pending verification data bucket using standard data to determine whether the data has problems. For example, the management platform may compare each of the data in the pending verification data bucket with the standard data, and determine the data of which a similarity is less than a similarity threshold as abnormal data.

The junk data cleaning means cleaning up redundant data. When the database occupancy is high, the database needs to be cleaned of unimportant data.

In some embodiments, the management platform may trigger a management operation of the junk data cleaning when the storage occupancy of the plurality of sub-databases is detected to be higher than an occupancy threshold. With the junk data cleaning, the unimportant data in the plurality of sub-database can be cleaned to free up storage space. In some embodiments, the management platform may determine second data sets with priorities lower than a priority threshold as the unimportant data and clean up the unimportant data. The occupancy threshold and the priority threshold may be set manually or based on historical experience.

In some embodiments, the plurality of sub-databases may be configured for the plurality of service sub-platforms to call the plurality of second data sets stored therein when the service platform receives the user use request initiated by the user platform. More descriptions regarding the calling may be found in FIG. 6 and related descriptions thereof.

More descriptions regarding the plurality of service sub-platforms may be found in FIG. 2 and related descriptions thereof.

In 370, in response to completion of junk data cleaning, an adjustment instruction may be issued to adjust a monitoring frequency of the monitoring device and/or an acquisition frequency of the data acquisition device.

The adjustment instruction refers to an instruction for adjusting the monitoring frequency of the monitoring device and/or the acquisition frequency of the data acquisition device. For example, the adjustment instruction may be an instruction for reducing an acquisition frequency of a temperature sensor.

In some embodiments, the data cleaned during the process of junk data cleaning may correspond to different production processes, and the management platform may determine an adjustment magnitude of the monitoring frequency of the monitoring device and/or the acquisition frequency of the data acquisition device corresponding to different production processes based on a cleaned quantity of the cleaned data of the different production processes. The adjustment magnitude may be positively correlated with the cleaned quantity. The more data that is cleaned, the more space available in the storage device, and the greater the adjustment magnitude of the acquisition frequency.

Cleaning up the junk data may carry some risk of misjudgment, so there's no guarantee that all the data cleaned up is the junk data. But since the junk data is cleaned, the storage devices corresponding to the plurality of sub-databases may store more data. In this case, the acquisition frequency of the data acquisition device and the monitoring frequency of the monitoring device on the production equipment corresponding to the production processes may be improved after the cleaning is completed, such that new data can be replenished as soon as possible.

In some embodiments of the present disclosure, the data management method based on the IIoT is provided. By classifying the raw data twice and transmitting and storing the classification results to different databases separately and performing the data management based on the priority of the data, high efficiency of data calling in case of the interaction demand can be realized, greatly reducing the data management pressure of the management platform, and contributing to the stable operation of the IIoT. By setting the sensor network platform in the form of the first general database and the plurality of sensor network sub-platforms, the raw data acquired by the object platform can be categorized and processed in the sensor network platform to share the processing pressure of the management platform. Each first data set classified in the sensor network platform is stored separately in the respective sub-database, and can only be transmitted through the one of the sensor network sub-platforms, ensuring the efficiency of data transmission. Further, since the management platform is set in the form of the second general database and the plurality of management sub-platforms, and in order to match the form of the plurality of service sub-platforms of the service platform, the internal data of the plurality of first data sets can be classified again in the second general database based on the function types of the plurality of service sub-platforms, and assigned to be stored in the plurality of sub-databases of the plurality of service sub-platform of the corresponding functions, so as to realize efficient calling of the data when there is a need for interaction. Since a part of the data management is configured to the sensor network platform and the service platform, the data management pressure of the management platform is greatly reduced, which contributes to the stable operation of the IIoT.

It should be noted that the foregoing description of the process 300 is intended to be exemplary and illustrative only and does not limit the scope of application of the present disclosure. For those skilled in the art, various corrections and changes can be made to the process 300 under the guidance of the present disclosure. However, such corrections and changes remain within the scope of the present disclosure.

Figure 4:
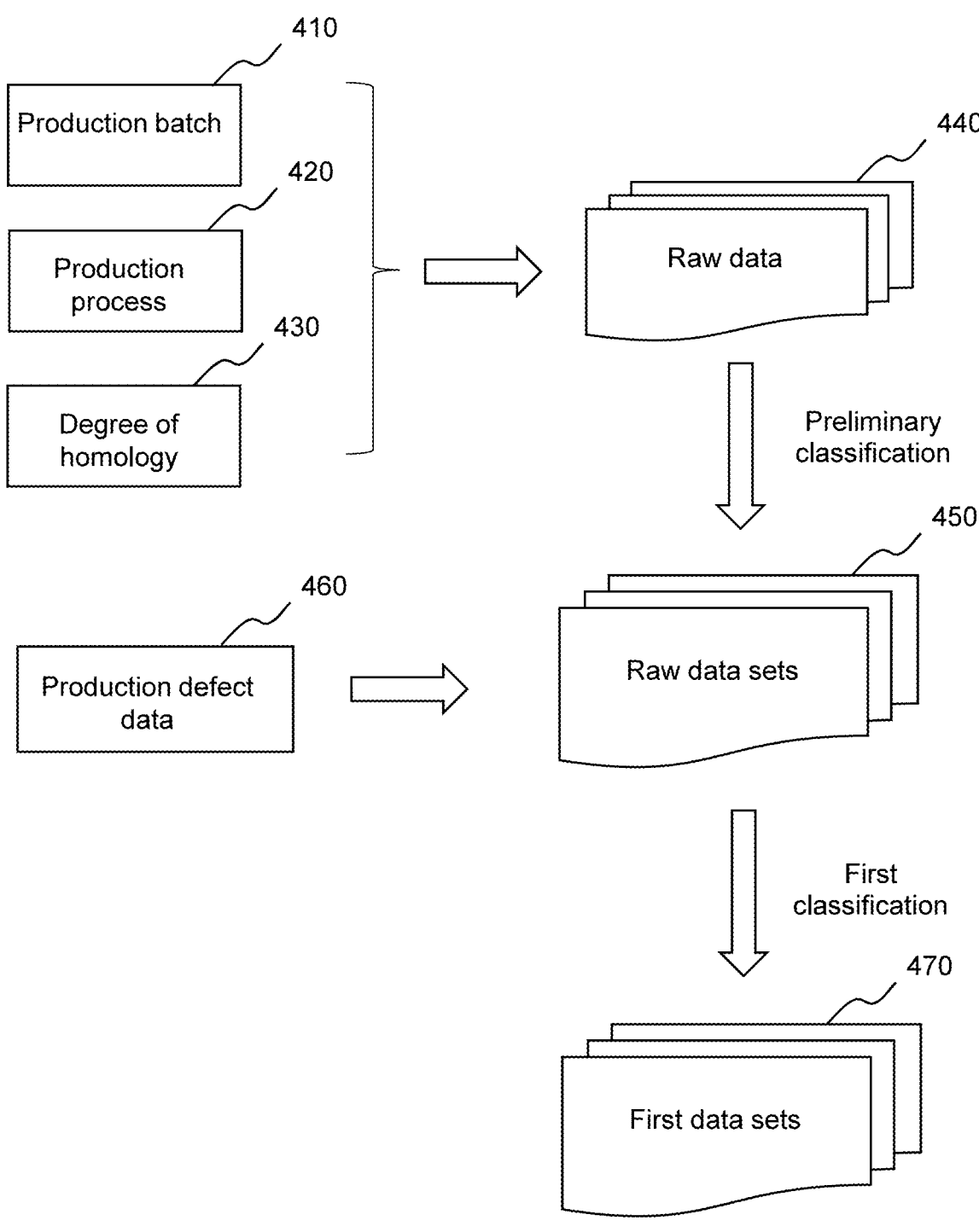
FIG. 4 is a schematic diagram illustrating an exemplary first classification according to some embodiments of the present disclosure.

FIG. 4 is a schematic diagram illustrating an exemplary first classification according to some embodiments of the present disclosure.

In some embodiments, as shown in FIG. 4, a management platform may perform a preliminary classification on raw data 440 based on a production batch 410 and a production process 420 of a product and a degree 430 of homology of the raw data, to obtain a plurality of raw data sets 450. The management platform may store the plurality of raw data sets 450 into a first general database in sequence. Further, the management platform may instruct, based on production defect data 460 of a preset time period, the first general database to perform the first classification on the plurality of raw data sets 450 based on a prioritization of the plurality of raw data sets 450 to generate a plurality of first data sets 470. More descriptions regarding storing in sequence may be found in the present disclosure below.

The plurality of raw data sets refer to collections of the plurality of raw data after the preliminary classification.

In some embodiments, the management platform may perform the preliminary classification on the raw data through various means based on the production batch and the production process of the product and the degree of homology of the raw data to obtain the plurality of raw data sets.

In some embodiments, the management platform may divide raw data belonging to the same production batch with the degree of homology greater than a degree threshold into a raw data set according to the production batch of the raw data, and divide raw data belonging to the same production process with the degree of homology greater than the degree threshold into a raw data set according to the production process of the raw data. In some embodiments, the management platform may divide the raw data belonging to the same production process in the same production batch and having a degree of homology greater than the degree threshold into a raw data set according to the production batch and production process of the raw data.

In some embodiments, the management platform may store the plurality of raw data sets in the first general database based on an order of the production batch and an order of the production process. For example, when the management platform performs the preliminary classification on the raw data based on the production batch, the plurality of raw data sets may be stored in the first general database in the order of the production batch. When the management platform performs the preliminary classification on the raw data based on the production process, the plurality of raw data sets may be stored in the first general database in sequence in the order of the production process. When the management platform performs the preliminary classification on the raw data based on the production batch and the production process, a plurality of raw data sets corresponding to a first production batch may be stored in the first general database in sequence in the order of the production process. Then a plurality of raw data sets corresponding to a second production batch may be stored in the first general database in sequence according to the order of the production process, and so on, until a plurality of raw data sets corresponding to the last production batch are stored in the first general database in sequence according to the order of production process.

The production defect data refers to data corresponding to time when a production defect occurs in a preset time period. A production defect may include an equipment failure, a product quality failure, or the like. The production defect data may include a defect type of the production defect occurring in the preset time period, time of occurrence of the defect, or the like. The defect type may include the equipment failure, the product quality failure, or the like. The preset time period may be a historical time period, which may be preset manually or by the system.

In some embodiments, in response to determining that a data anomaly is discovered during data processing, the management platform may determine all the raw data acquired by a data acquisition device and a monitoring device acquiring the data as the production defect data. In some embodiments, in response to determining that the production equipment has a significant failure during production (e.g., downtime, etc.), the management platform may determine the affected raw data as the production defect data.

The prioritization of the plurality of raw data sets refers to a priority of performing the first classification on the plurality of raw data sets. The higher the priority, the higher the priority to perform the first classification.

In some embodiments, the management platform may statistically count, in the production defect data, a frequency of occurrence of production defects in different production batches; and determine the priorities of the plurality of raw data sets corresponding to different production batches based on the frequency of occurrence of the production defects. In some embodiments, the priorities of the plurality of raw data sets may be positively correlated with the frequency of occurrence of the production defects.

In some embodiments, the management platform may statistically count, in the production defect data, an average time interval of occurrence of production defects in different production processes during the preset time period; and determine the priorities of the plurality of the plurality of raw data sets corresponding to different production processes based on the average time interval of occurrence of the production defects. In some embodiments, the priorities of the plurality of the plurality of raw data sets may be negatively correlated with the average time interval of occurrence of the production defects. The average time interval of occurrence of production defects may be an average value of time intervals between time points at which the production defects occur multiple times during the preset time period and the current time point.

In some embodiments, the management platform may determine the priorities of the plurality of raw data sets by weighted summation based on the frequency of occurrence of the production defects in different production batches and the average time interval of occurrence of the production defects in different production processes in the preset time period. A weight of the weighted summation may be set manually.

In some embodiments, the management platform may also determine whether each of the plurality of raw data sets include contamination data based on the production defect data in the preset time period and an acquisition parameter of the data acquisition device, and determine the prioritization of the plurality of raw data sets based on a result of whether each of the plurality of raw data sets includes the contaminate data.

The acquisition parameter of the data acquisition device refers to a parameter related to the acquisition of the raw data by the data acquisition device. For example, the acquisition parameter of the data acquisition device may include an acquisition frequency of the data acquisition device, etc. In some embodiments, the acquisition parameter may be determined and updated by the management platform and sent to the corresponding data acquisition device. For example, the management platform may determine the acquisition parameter of the data acquisition device based on the historical acquisition of the raw data by the data acquisition devices of the same type, and update the acquisition parameter of the data acquisition device based on the size of available storage space.

The contamination data refers to data that misleads the system into determining that a production defect exists. For example, because of a potential production defect that may occur, there is data in individual data sets that is easily recognized by the system as having problems (actually unrelated to and unaffected by the production defects, which is referred to as the contamination data), which may cause time delay and affect the processing efficiency due to subsequent misdirection by the contamination data when the cause or source of the production defects is determined.

In some embodiments, the management platform may construct a target vector based on the production defect data, the production batches, and the production processes corresponding to the plurality of raw data sets, and the data source, data type, and the acquisition parameter of the raw data in the plurality of raw data sets; and retrieve in a vector database based on the target vector, and determine whether the contamination data exists based on a retrieval result. The vector database may be constructed based on historical data, including: selecting a historical raw data set including the production defects; and constructing a reference vector based on the production defect data, the production batch, and the production process corresponding to the historical raw data set, and the data source, the data type, and the acquisition parameter of the raw data in the historical raw data set. The historical raw data having problems may be verified manually/systematically, and the historical raw data that has problems but is not related to the production defects may be determined as the contamination data. The contamination data may be correlated with the reference vector. A plurality of reference vectors and correlated contamination data thereof may be obtained by repeating the operations to obtain the vector database.

In some embodiments, the management platform may retrieve in the vector database based on the target vector, and determine contamination data corresponding to a reference vector of which a vector distance to a target vector is less than a distance threshold as the contamination data corresponding to the target vector. When the reference vector of which the vector distance to the target vector is less than the distance threshold can no longer be retrieved from the vector database, it can be determined that no contamination data exists in the raw data set corresponding to the target vector.

In some embodiments, the management platform may determine the prioritization of the plurality of raw data sets based on a result of whether each of the plurality of raw data sets includes the contamination data. For example, the priority of the raw data set that includes the contamination data may be less than the priority of the raw data set that does not include the contamination data.

In some embodiments, the priority of each of the plurality of raw data sets may be negatively correlated with a volume of the contamination data in the raw data set. The management platform may determine the priority of each of the plurality of raw data sets based on the volume of the contamination data. For example, the less contamination data, the higher the priority of the raw data set.

In some embodiments, the management platform may also determine the prioritization of the plurality of raw data sets by evaluating the priorities of the plurality of raw data sets through a priority evaluation model based on the data sources, the data types, and data generation time of the plurality of raw data sets, and the result of whether each of the plurality of raw data sets includes the contamination data. The data sources, the data types, and the data generation time of the plurality of raw data sets refer to the data source, the data type, and the data generation time of each raw data in each of the plurality of raw data sets.

In some embodiments, the priority evaluation model may be a machine learning model, such as a convolutional neural networks (CNN) model, a deep neural networks (DNN) model, a recurrent neural networks (RNN) model, or the like, or any combination thereof.

In some embodiments, the priority evaluation model may be obtained by training based on a large number of training samples with labels. In some embodiments, the training process may include: obtaining a plurality of training data sets and labels corresponding to the plurality of training data sets, and performing a plurality of iterations based on the plurality of training data sets and the labels corresponding to the plurality of training data sets.

In some embodiments, each of the plurality of training data sets may include a plurality of training samples and labels corresponding to the plurality of training data sets. In some embodiments, the plurality of training samples may include sample data sources, sample data types, and sample data generation time of sample raw data sets, and the result of whether the sample raw data sets include the contamination data. The labels corresponding to the plurality of training data sets may include the prioritization of the plurality of sample raw data sets corresponding to the plurality of training samples. The sample data sources, the sample data types, and the sample data generation time of the sample raw data sets refer to the sample data source, the sample data type, and the sample data generation time of each sample raw data in each of the sample raw data set.

In some embodiments, at least one of the plurality of iterations may include: selecting one or more training samples from the plurality of training data sets, and inputting the one or more training samples into an initial priority evaluation model to obtain model predicted outputs corresponding to the one or more training samples; calculating a value of a loss function by substituting the model predicted outputs corresponding to the one or more training samples, and the labels corresponding to the plurality of training data sets into a formula of the predefined loss function; inversely updating model parameters of the initial priority evaluation model based on the value of the loss function, which may be carried out using various modes. For example, the updating may be performed based on gradient descent. The iteration may be terminated when an iteration termination condition is satisfied, and a trained priority evaluation model may be obtained.

In some embodiments, the plurality of training data sets and the labels corresponding to the plurality of training data sets may be obtained based on historical production data. For example, historical raw data sets in historical production processes may be used as sample raw data sets, and the data sources, the data types, and the data generation time of the historical raw data sets, and the results of whether the historical raw data sets include the contamination data may be used as training data sets. Further, the priorities of the training data sets may be labeled by the same way as determining the priorities of the plurality of raw data sets, in conjunction with whether the training data sets include the contamination data, to obtain the labels corresponding to the plurality of training data sets. The more contamination data the plurality of training data sets include, the lower the priorities of the plurality of training data sets.

In some embodiments, the management platform may set training sample sets that include the contamination data and training sample sets that do not include the contamination data, respectively. For example, one or more sample raw data sets in the one or more training sample sets may be set not to include the contamination data. The type of the one or more training sample sets are referred to as positive training sample sets. As another example, one or more sample raw data sets in the one or more training sample sets may be set to include the contamination data. The type of one or more training sample sets are referred to as negative training sample sets.

In some embodiments, the management platform may perform cross-training based on different training sample sets. For example, one or more iterations of updating may be performed based on the training sample sets that include the contamination data before one or more iterations of updating are performed based on the training sample sets that do not include the contamination data. The cross-training may be repeated to reversely update the model parameters of the initial priority evaluation model.

In some embodiments, when setting the training sample sets, the management platform may also set a plurality of training sample sets including different production defect data separately. The plurality of training sample sets including the production defect data means that one or more sample raw data sets in the plurality of training sample sets include the production defect data. Correspondingly, when training the model, the management platform may set different learning rates for different training sample sets. For example, for a training sample set that has a larger number of sample raw data sets including the production defect data and a relatively complex variety of production defects, the set learning rate may be lower than the learning rate usually set to ensure the training effect. For other training sample sets, the set learning rate may be higher than the usually set learning rate to ensure the training rate.

In some embodiments of the present disclosure, the priority evaluation model may be trained by methods such as cross-training, setting different learning rates, or the like, which can improve the accuracy of the model training while guaranteeing the training rate. By determining the prioritization of the plurality of raw data sets through the priority evaluation model, the obtained prioritization is more accurate.

In some embodiments of the present disclosure, by analyzing whether the contamination data is included in the data set, it is possible to timely determine the data set that truly has problems when the data needs to be analyzed to determine the cause of the defect, avoiding additional data processing time.

Figure 5:
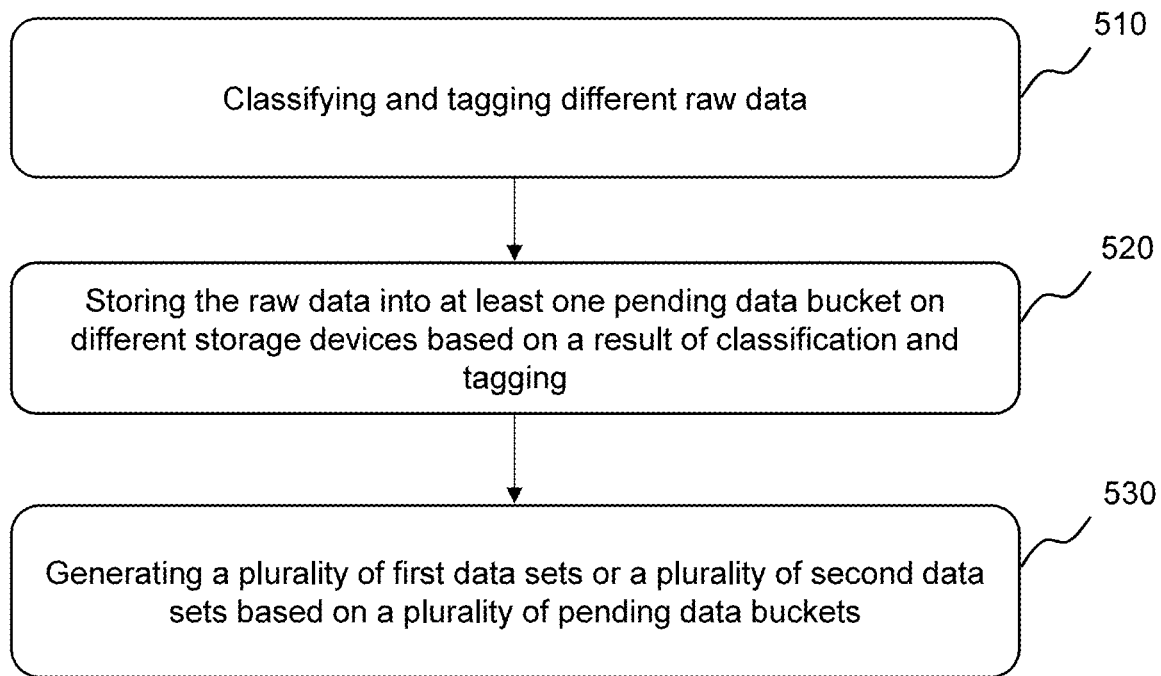
FIG. 5 is a flowchart illustrating an exemplary first classification according to some embodiments of the present disclosure.

FIG. 5 is a flowchart illustrating an exemplary first classification according to some embodiments of the present disclosure. As shown in FIG. 5, a process 500 may include the following operations. In some embodiments, the process 500 may be performed by a management platform.

In 510, different raw data may be classified and tagged.

The classifying and tagging refer to tagging types of pending data buckets into which the raw data is stored.

In some embodiments, the management platform may also preset a plurality of pending data buckets in a first general database. Different pending data buckets may be located on different storage devices.

The plurality of pending data buckets refers to storage spaces reserved for data processing. The plurality of pending data buckets may be indexed. An index allows a user to quickly find a storage location of the data in the plurality of pending data buckets.

In some embodiments, the plurality of pending data buckets may include at least one type of a contamination data bucket, a filing data bucket, a pending verification data bucket. Different types of pending data buckets may be located on different storage devices.

The contamination data bucket may be configured to store the contamination data.

The filing data bucket may be configured to store data that does not need to be verified and for filing purposes only (subsequently referred to as filing data).

The pending verification data bucket may be configured to store pending verification data. The pending verification data refers to raw data that may be abnormal. For example, a normal environmental temperature may be 25° C., and if a particular environmental temperature is 30° C., the environmental temperature may be the pending verification data.

In some embodiments, different types of pending data buckets may have different allocation capacities. In some embodiments, the allocation capacities of the plurality of pending verification data buckets may be determined based on production defect data of a preset time period.

In some embodiments, the allocation capacities of the plurality of pending verification data buckets may be positively correlated with an average time interval in which production defects occur in the production defect data of the preset time period and a count of times the production defects occur. For example, the allocation capacities of the plurality of pending verification data buckets may be calculated by the following formula (1):

$$L = L_s \times n^{-t} \tag{1}$$

wherein L denotes the allocation capacity of the pending verification data bucket, $L_s$ denotes an initial allocation capacity, n denotes the count of times the production defects occur, and t denotes the average time interval in which the production defects occur. The initial allocation capacity may be preset manually. More descriptions regarding the average time interval in which the production defects occur may be found in FIG. 4 and related descriptions thereof.

In some embodiments of the present disclosure, by reasonably setting the allocation capacities of the plurality of pending verification data buckets, it can be ensured that the database has enough space for storing the pending verification data, avoiding data overflow caused by production accidents.

In some embodiments, in response to determining that the raw data is the contamination data, the management platform may classify and tag the raw data as data to be stored into the contamination data bucket; in response to determining that the raw data is data in which the production defects occur, classify and tag the raw data as data to be stored into the pending verification data bucket; and in response to determining that the raw data is not the contamination data and does not include the production defects, classify and tag the raw data as data to be stored into the filing data bucket.

In some embodiments, in response to determining that the raw data is the contamination data, the management platform may classify and tag the raw data as the data to be stored into the contamination data bucket, and classify and tag the raw data as the data to be stored into the pending verification data bucket.

In some embodiments, in response to determining that the plurality of raw data sets include the contamination data, the management platform may classify and tag the plurality of raw data sets as the data set to be stored into the contamination data bucket; in response to determining that the plurality of raw data sets include data in which the production defects occur, classify and tag the plurality of raw data sets as the data set to be stored into the pending verification data bucket; and in response to determining that the raw data does not include the contamination data and the data with production defects, classify and tag the plurality of raw data sets as the data sets to be stored into the filing data bucket.

In some embodiments, in response to determining that an equipment operating parameter and an environmental parameter of the production equipment corresponding to the raw data change, the management platform may classify and tag the equipment operating parameter and the environmental parameter during a time period in which the change occurs and the raw data corresponding to a product detection parameter as pending verification data or junk data; in response to determining that no change occurs, classify and tag the raw data as data to be stored into the filing data bucket. More descriptions regarding the equipment operating parameter and the environmental parameter may be found in FIG. 3 and related descriptions thereof.

In some embodiments, in response to determining that an amount of change in the equipment operating parameter and the environmental parameter exceeds a corresponding change threshold, respectively, the management platform may determine that the equipment operating parameter and the environmental parameter change. Otherwise, the management platform may determine that the equipment operating parameter and the environmental parameter do not change.

In some embodiments, in response to determining that the equipment operating parameter and the environmental parameter change, the management platform may determine the equipment operating parameter and the environmental parameter of which the amount of change exceeds a preset range and the raw data corresponding to the product detection parameter as the junk data, and determine the equipment operating parameter and the environmental parameter of which the amount of change does not exceed the preset range and the raw data corresponding to the product detection parameter as the pending verification data. The preset range may be set manually. For example, the preset range of the environmental temperature may be within a range of 10° C.-40° C. It is understood that if the environmental temperature is −20° C. or 60° C., it is obvious that the environmental temperature does not conform to the objective law and does not have a reference value, and the environmental temperature may be directly determined as the junk data.

In some embodiments, the management platform may set, based on the production defect data, a change threshold for determining whether the equipment operating parameter and the environmental parameter change, respectively. The change threshold is a threshold for determining whether a process parameter or the environmental parameter changes. For example, the change threshold corresponding to the environmental temperature may be 3° C., or the like.

In some embodiments, the management platform may determine the change threshold based on the amount of change in the equipment operating parameter and the environmental parameter in the production defect data. For example, the management platform may count the amount of change in the equipment operating parameter and the environmental parameter each time a production defect occurs and determine the smallest amount of change as the change threshold.

In some embodiments of the present disclosure, when the process parameter of the processing equipment and the environmental parameter in the raw data change, whether the data set is pending verification data set may be reasonably determined, such that the data volume of the redundant data can be reduced, and the efficiency of the data processing can be ensured.

In 520, the raw data may be stored into at least one pending data bucket on different storage devices based on a result of classification and tagging.

In some embodiments, the management platform may store the pending verification data into the pending verification data bucket. In some embodiments, the management platform may store the contamination data into the contamination data bucket. In some embodiments, the management platform may store the filing data into the filing data bucket.

In 530, a plurality of first data sets or a plurality of second data sets may be generated based on a plurality of pending data buckets.

In some embodiments, for each pending verification data bucket, the management platform may instruct a first general database to perform a first classification according to a first classification instruction. For example, raw data belonging to the same data type in each pending verification data bucket may be classified into a first data set.

In some embodiments, the management platform may store the plurality of first data sets in the pending verification data bucket or the contamination data bucket to a plurality of sub-databases configured in the sensor network platform, respectively, and transmit and store the plurality of first data sets to a second general database in the management platform through a plurality of sensor network sub-platforms corresponding to the plurality of sub-databases for performing a second classification in the second general database.

In some embodiments, the management platform may store the plurality of first data sets in the raw data in the filing data bucket to a plurality of sub-databases configured in the sensor network platform, respectively, and transmit and store the plurality of first data sets to the second general database in the management platform through a plurality of sensor network sub-platforms corresponding to the plurality of sub-databases. In this case, the plurality of first data sets can be directly determined as the plurality of second data sets without performing the second classification on the plurality of first data sets in the second general database.

In some embodiments, the management platform may generate a data processing order corresponding to the plurality of pending data buckets based on a prioritization of the plurality of raw data sets, and the plurality of pending data buckets preset in the first general database; and process the raw data in the plurality of pending data buckets based on the data processing order.

The data processing order refers to an order in which the plurality of pending data buckets are processed.

In some embodiments, one or more raw data sets may be stored in each of the plurality of pending data buckets.

In some embodiments, the management platform may determine the data processing order corresponding to the plurality of pending data buckets based on the prioritization of the plurality of raw data sets included in each of the plurality of pending data buckets.

In some embodiments, in response to determining that a raw data set (which is referred to as a target raw data set hereinafter) with the highest priority in the plurality of pending data buckets of which the priority is greater than a preset priority threshold, the management platform may determine that the data processing order of the pending data bucket is prioritized. When there are a plurality of pending data buckets in which the priorities of the target raw data sets are greater than the preset priority threshold, the target raw data sets may be prioritized, and a result of the prioritization may be used as the data processing order of the pending data buckets in which the target raw data sets is located.

In some embodiments, in response to determining that the priorities of the target raw data sets in the pending data bucket are not greater than the preset priority threshold, the management platform may perform weighted summation of the priorities of all the raw data sets in the pending data bucket, and take a weighted summation result as the priority of the pending data bucket; and determining the data processing order based on the priority of the pending data bucket. For example, the higher the priority of the pending data bucket, the higher the data processing order of the pending data bucket. The preset priority threshold may be set manually.

In some embodiments, if a particular raw data set is susceptible to change when a production defect occurs, a weight of the priority of the raw data set may be increased.

In some embodiments, the plurality of pending data bucket may further include a queue insertion data bucket. The queue insertion data bucket may be configured to store data for queue insertion processing.

In some embodiments, in response to determining that the priority of the raw data set in the pending data bucket is greater than the preset priority threshold and the raw data set includes production defect data, the management platform may store the raw data set in the queue insertion data bucket.

In some embodiments, in response to determining that the priority of the raw data set in the pending data bucket is greater than the preset priority threshold, the management platform may determine whether the raw data set can be stored in the queue insertion data bucket, in conjunction with production time or a production cycle. For example, when the production time of the raw data set is abnormal or the production cycle is abnormal, the raw data set may be stored in the queue insertion data bucket.

In some embodiments of the present disclosure, by setting the queue insertion data bucket, data requiring urgent processing can be prioritized, and the cause of production defects can be located in time, thereby reducing losses.

In some embodiments of the present disclosure, by reasonably setting the data processing order of the plurality of pending data buckets, it can be ensured that the data set to be prioritized can automatically enter into a prioritized processing sequence without manual intervention, and the data set to be prioritized can be processed, thereby ensuring the data processing efficiency.

In some embodiments, the management platform may determine, based on the data processing order of the plurality of current pending data buckets, a count of pending data buckets that are classified as filing data buckets, i.e., a count of filing data buckets.

In some embodiments, the management platform may determine a current processing load based on the data processing order of plurality of current pending data buckets; and determine the count of filing data bucket based on the current processing load and a maximum allowable processing load.

In some embodiments, the management platform may determine, based on the data processing order of the plurality of current pending data buckets, a count of current raw data sets in the plurality of current pending data buckets; determine a ratio of the count of current raw data sets to a maximum count of raw data sets that can be processed as the current processing load. The maximum count of raw data sets that can be processed and the maximum allowable processing load may be system defaults, perceived preset values, or the like.

In some embodiments, the management platform may determine the count of the filing data buckets based on a ratio of the current processing load to the maximum allowable processing load. Merely by way of example, the management platform may determine the count of the filing data buckets by using the following formula (2):

$$N = N_s \times (M_u / M_t) \times p \qquad (2)$$

wherein N denotes the count of the filing data buckets; $N_s$ denotes an initial value of the filing data buckets; $M_u$ denotes the current processing load; $M_t$ denotes the maximum allowable processing load; and p denotes a production coefficient.

In some embodiments, the initial value of the filing data buckets and the production coefficient may be system defaults, perceived preset values, or the like.

In some embodiments, different production coefficients may be preset for different production processes. For example, production coefficients for different production processes may be determined by a data volume of the filing data generated by different production processes. The larger the data volume of the generated filing data, the larger the production coefficient.

In some embodiments of the present disclosure, by reasonably setting different pending data buckets, the raw data can be efficiently screened to ensure the quality of the subsequent data management, thereby improving the processing efficiency of the generated data set.

In some embodiments, after the plurality of second data sets are stored in the plurality of sub-databases corresponding to different service sub-platforms based on the prioritization of the plurality of second data sets and the data management is implemented, the management platform may further perform the following process 600.

FIG. 6 is a flowchart illustrating an exemplary process of calling sub-databases according to some embodiments of the present disclosure. As shown in FIG. 6, the process 600 may include the following operations. In some embodiments, the process 600 may be performed by a management platform.

In 610, in response to determining that a service platform receives a user use request initiated by a user platform, function types of a plurality of service sub-platforms to be called may be determined based on the user use request.

More descriptions regarding the user use request may be found in FIG. 3 and related descriptions thereof.

The plurality of service sub-platform to be called refer to service sub-platforms configured to fulfill the user use request.

In some embodiments, the service platform may determine, based on the request content of the user use request, the function types of the plurality of service sub-platforms that match the request content. Different user use requests may be fulfilled using different service sub-platforms. More descriptions may be found in FIG. 3 and related descriptions thereof.

In 620, a plurality of target service sub-platforms may be obtained based on the function types of the plurality of service sub-platforms to be called.

The plurality of target service sub-platforms refer to service sub-platforms that are ultimately selected to fulfill the use request. In some embodiments, the management platform may select at least one of the plurality of service sub-platforms to be called as the target service sub-platform.

In 630, a plurality of sub-databases corresponding to the plurality of target service sub-platforms may be called, and a plurality of second data sets stored in the plurality of sub-databases may be transmitted to a user platform via a third general database.

In order to fulfill the user use request, the plurality of second data set need to be transmitted to the user platform. In some embodiments, the management platform may call the plurality of sub-databases corresponding to the plurality of target service sub-platforms, and transmit the plurality of the second data sets stored in the plurality of sub-databases to the user platform via the third general database. More descriptions regarding the third general database may be found in FIG. 2 and related descriptions thereof.

In some embodiments, before the plurality of sub-databases corresponding to the plurality target service sub-platforms are called and the plurality second data sets stored in the plurality sub-databases are transmitted to the user platform via the third general database, the management platform may also determine whether the plurality second data sets to be transmitted include homologous tagged data; and in response to determining that the plurality of second data sets to be transmitted include the homologous tagged data, transmit the homologous tagged data having the same homologous tags in the first general database to the plurality of sub-databases corresponding to the plurality of target service sub-platforms. More descriptions regarding the homologous tagged data and homologous tagging may be found in FIG. 3 and related descriptions thereof.

The homologous tagged data refers to raw data after homologous tagging. That is, each raw data in at least one homologous data set obtained after homologous tagging is considered to be after homologous tagging, i.e., each raw data in the at least one homologous data set is the homologous tagged data.

In the specific implementation process, based on the homologous tagging of the raw data in the embodiments, when the plurality of second data sets stored in the plurality of sub-databases are called and it is determined that the raw data therein includes the homologous tags, it means that there is still another portion of related raw data that is not transmitted. In this case, another portion of the raw data with the same homologous tags may be transmitted to the plurality of sub-databases corresponding to the plurality of target service sub-platforms, so as to be transmitted to the user platform for reference when the plurality of second data sets are called.

In some embodiments of the present disclosure, by transmitting the homologous tagged data to the plurality of sub-databases, more relevant data can be provided to the user, and the user use request can be more easily fulfilled, thereby improving the user experience.

In some embodiments, in response to determining that the plurality of second data sets to be transmitted include the homologous tagged data, the management platform may obtain the homologous tagged data having the same homologous tags in the first general database; classify and package the homologous tagged data based on types of the homologous tags of the homologous tagged data to obtain packaged data; and transmit the packaged data to the plurality of sub-databases corresponding to the plurality of target service sub-platforms.

The packaged data refer to a plurality of data sets obtained by classifying the homologous tagged data based on the types of the homologous tags. For example, a plurality of packaged data may correspond to a plurality of types of homologous tags (e.g., primary homologous tagging, secondary homologous tagging, or the like).

In some embodiments, the management platform may retrieve homologous tagged data having the same homologous tags as the second data set to be transmitted from the first general database, and classify the homologous tagged data having the same type of homologous tags to obtain the plurality of packaged data.

Some embodiments of the present disclosure, by packaging the homologous tagged data based on the type of homologous tags and transmitting the packaged data to the sub-database, are able to select the amount of data and the degree of correlation of the data to be provided to the user according to the actual needs and to improve user experience.

In some embodiments, the management platform may transmit the packaged data in the first general database to a sub-database corresponding to a target service sub-platform by selecting a sensor network sub-platform. In some embodiments, the management platform may also determine target sensor network sub-platforms based on a transmission resource occupation of the sensor network sub-platforms; and transmit the packaged data to the sub-databases corresponding to the target service sub-platforms via the target sensor network sub-platforms.

The transmission resource occupation refers to a ratio of a data volume being transmitted to a rated data volume to be transmitted. The management platform may obtain the data volume being transmitted in each sensor network sub-platform and the rated data volume to be transmitted by accessing the sensor network platform. When the transmission resource occupation is relatively small, the sensor network sub-platforms may be in a state of idleness or less transmission pressure.

The target sensor network sub-platform refers to a sensor network sub-platform selected for transmitting the packaged data. In some embodiments, the management platform may select a sensor network sub-platform with a smaller transmission resource occupation as the target sensor network sub-platform.

In some embodiments of the present disclosure, by selecting the sensor network sub-platform with the smaller transmission resource occupation for transmitting the packaged data, the transmission efficiency of the packaged data can be improved, the efficiency of data interaction can be enhanced, and the waiting time of the user can be reduced, thereby improving the user experience.

In some embodiments of the present disclosure, in the face of different user selection requirements, sub-databases corresponding to different service sub-platforms may be called, and different service sub-platforms may be configured to realize different user use requirements, which can realize efficient calling of the data and reduce the management pressure of the management platform.

Based on the same inventive conception as in the embodiments, the embodiments of the present disclosure further provide a data management device based on IIoT. The data management device may be applied to the IIoT. The IIoT may include a user platform, a service platform, a management platform, a sensor network platform, and an object platform connected in sequence. The data management device may include: a first storage module, configured to generate a data acquisition instruction and send the data acquisition instruction to a data acquisition device and a monitoring device in the object platform, and transmit and store raw data acquired by the object platform to a first general database in the sensor network platform via the sensor network platform; wherein the data acquisition instruction may be configured to acquire the raw data in different production processes, and the data acquisition device and the monitoring device ma be respectively set on production equipment corresponding to the different production processes; a first classification module, configured to generate a first classification instruction based on a data type of the raw data and send the first classification instruction to the first general database, the first classification instruction being configured to instruct the first general database to perform a first classification on the raw data to obtain a plurality of first data sets; a second storage module, configured to send a first storage instruction to the first general database, the first storage instruction being configured to instruct the first general database to store the plurality of first data sets into a plurality of sub-databases configured in the sensor network platform, respectively, and transmit and store the plurality of first data sets to a second general database in the management platform via sensor network sub-platforms corresponding to the plurality of sub-databases, respectively, wherein storage capacities of different sub-databases may be determined based on the different production processes; a second classification module, configured to generate a second classification instruction based on function types of a plurality of service sub-platforms in the service platform, the second classification instruction being configured to instruct the second general database to perform a second classification on the raw data in the plurality of first data sets to obtain a plurality of second data sets; a third storage module, configured to generate a second storage instruction based on a prioritization of the plurality of second data sets, the second storage instruction being configured to instruct the second general database to store the plurality of second data sets into sub-databases corresponding to different service sub-platforms, and the sub-databases being used for the service sub-platforms to call the plurality of second data sets stored therein when the service platform receives a user use request initiated by the user platform; a management module, configured to send, in response to existence of a data management demand, a data management instruction to the sub-databases corresponding to different service sub-platforms to realize data management, the data management including at least one of data processing order division, data verification, junk data cleaning; and an adjustment module, configured to issue, in response to completion of the junk data cleaning, an adjustment instruction to adjust a monitoring frequency of the monitoring device and/or an acquisition frequency of the data acquisition device.

Based on the same inventive conception as in the preceding embodiments, embodiments of the present disclosure further provide an electronic device comprising a processor and a storage device. The storage device may be configured to store computer programs. The processor may be configured to load and execute the computer programs to cause the electronic device to perform the data management method based on the IIoT as described above.

Some embodiments of the present disclosure provide a data management method and device based on IIoT and equipment, which aim to solve the problem of poor effect of data management based on the IIoT in the prior art.

In order to realize the above purposes, some embodiments of the present disclosure adopt the following technical solution.

In a first aspect, some embodiments of the present disclosure provide a data management method based on IIoT. The data management method may be applied to the IIoT. The IIoT may include a user platform, a service platform, a management platform, a sensor network platform, and an object platform. The sensor network platform may include a first general database and a plurality of sensor network sub-platforms. A sub-database may be configured in each of the plurality of sensor network sub-platforms, respectively. The plurality of sensor network sub-platforms may interact with the first general database. The management platform may include a second general database and a plurality of management sub-platforms. The second general database may interact with the plurality of sensor network sub-platforms and the plurality of management sub-platforms. The service platform may include a third general database, a plurality of sub-databases, and a plurality of service sub-platforms. The third general database may interact with the user platform. The third general database may interact with the second general database through the plurality of sub-databases. The plurality of sub-databases may interact with one service sub-platform, respectively. The data management method may include the following operations S11-S15:

S11. raw data acquired by the object platform may be transmitted and stored in the first general database;

S12. a plurality of first data sets may be obtained by performing a first classification on the raw data in the first general database based on a data type of the raw data;

S13. each of the plurality of first data sets may be stored in the sub-database corresponding to each of the plurality of first data sets, and each of the plurality of first data sets may be stored in the second general database via the sensor network sub-platform where the sub-database is located;

S14. a plurality of second data sets may be obtained by performing a second classification on data in each of the plurality of first data sets in the second general database based on function types of the plurality of service sub-platforms; and S15. each of the plurality of second data sets may be stored in the corresponding sub-database of the service platform to realize data management based on a priority of data; wherein the sub-database may be used for being called by the service sub-platform when the service platform responds to a use request initiated by the user platform.

In one embodiment of the first aspect, after the raw data acquired by the object platform is transmitted and stored in the first general database, the method may further include the following operations S21-S23:

S21. tagged raw data may be obtained by performing homologous tagging on the raw data based on a degree of homology of the raw data;

S22. the plurality of first data sets may be obtained by performing the first classification on the raw data in the first general database based on the data type of the raw data, including:

S23. the plurality of first data sets may be obtained by performing the first classification on the tagged raw data in the first general database based on the data type of the raw data.

In one embodiment of the first aspect, after each of the plurality of second data sets is stored in the corresponding sub-database of the service platform based on the priority of data to realize data management, the method may further include the following operations S31-S32:

S31. in response to the use request initiated by the user platform, the service platform may determine function types of the service sub-platforms to be called according to the use request and obtain the target service sub-platforms; and S32. the sub-databases corresponding to the target service sub-platforms may be called and the second data sets in the sub-databases may be transmitted to the user platform via the third general database.

In one embodiment of the first aspect, before the sub-databases corresponding to the target service sub-platforms are called and the second data sets in the sub-databases are transmitted to the user platform via the third general database, the method may further include the following operations S41-S42:

S41. whether the transmitted second data sets include homologous tags is determined;

S42. in response to determining that the transmitted second data sets include the homologous tags, the raw data having the homologous tags in the first general database may be transmitted to the sub-databases corresponding to the target service sub-platforms.

In one embodiment of the first aspect, the in response to determining that the transmitted second data sets include the homologous tags, the raw data having the homologous tags in the first general database may be transmitted to the sub-databases corresponding to the target service sub-platforms may include the operations S51-S53:

S51. in response to determining that the transmitted second data sets include the homologous tags, the raw data having the homologous tags in the first general database may be obtained;

S52. the raw data may be classified and packaged according to the types of the homologous tags of the raw data to obtain the packaged data; and S53. the packaged data may be transmitted to the sub-databases corresponding to the target service sub-platforms.

In one embodiment of the first aspect, the types of the homologous tags may include a primary homologous tag and a secondary homologous tag. Before the raw data is classified and packaged according to the types of the homologous tags of the raw data to obtain the packaged data, the method may further include: in response to determining that the degree of homology of the raw data is greater than a first threshold, performing primary homologous tagging on the raw data; and in response to determining that the degree of homology of the raw data is greater than a second threshold and less than the first threshold, performing secondary homologous tagging on the raw data.

In one embodiment of the first aspect, before the packaged data is transmitted to the sub-databases corresponding to the target service sub-platforms, the method may further include the following operations S61-S63:

S61. target sensor network sub-platforms may be determined based on a transmission resource occupation of the sensor network sub-platforms;

S62. the packaged data may be transmitted to the sub-databases corresponding to the target service sub-platforms, including:

S63. the packaged data may be transmitted to the sub-databases corresponding to the target service sub-platforms via the target sensor network sub-platforms.

In one embodiment of the first aspect, the each of the plurality of second data sets is stored in the corresponding sub-database of the service platform based on the priority of data to realize data management may include:

evaluating the priorities of the plurality of second data sets through a priority evaluation model to obtain the prioritization of the plurality of second data sets; the priority evaluation model being a machine learning model; processing the plurality of second data sets in sequence according to the prioritization of the plurality of second data sets, and storing a plurality of processed second data sets into the sub-databases corresponding to different service sub-platforms, respectively, for data management; and updating the priority of data in real time, when a pending second data set of a higher priority exists in the second general database, aborting, based on a preemptive scheduling algorithm, a current processing task of the second data set and assigning a processor to prioritize the processing of the pending second data set of the higher priority.

In a second aspect, some embodiments of the present disclosure provide a data management device based on IIoT. The data management device may be applied to the IIoT. The IIoT may include a user platform, a service platform, a management platform, a sensor network platform, and an object platform. The sensor network platform may include a first general database and a plurality off of sensor network sub-platforms. A sub-database may be configured in the plurality off sensor network sub-platforms, respectively, and the plurality off of sensor network sub-platforms may interact with the first general database. The management platform may include a second general database and a plurality of management sub-platforms. The second general database may interact with the plurality of sensor network sub-platforms and the plurality of management sub-platforms. The service platform may include a third general database, a n plurality of sub-databases, and a plurality of service sub-platforms. The third general database may interact with the user platform. The third general database may interact with the second general database via the plurality of sub-databases. The plurality of sub-databases may interact with one service sub-platform, respectively. The data management device may include: a first storage module, configured to transmit and store raw data acquired by the object platform to the first general database; a first classification module, configured to perform a first classification on the raw data in the first general database based on a data type of the raw data to obtain a plurality of first data sets; a second storage module, configured to store the plurality of first data sets into a plurality of corresponding sub-databases, and transmit and store the plurality of first data sets to the second general database via a plurality of sensor network sub-platforms on which the plurality of sub-databases are located; a second classification module, configured to perform a second classification on data in each of the plurality of first data sets in the second generate database to obtain a plurality of second data sets; and a third storage module, configured to store the plurality of second data sets into sub-databases corresponding to different service sub-platforms to realize data management based on the prioritization. The plurality of sub-databases may be configured to be called by the plurality of service sub-platforms when the service platform responds to a use request initiated by the user platform.

In a third aspect, some embodiments of the present disclosure provide an electronic device comprising a processor and a storage device. The storage device may be configured to store computer programs. The processor may be configured to load and execute the computer programs to cause the electronic device to perform the data management method based on the IIoT as described in any aspect above.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or features may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various parts described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required features of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A data management method based on an Industrial Internet of Things (IIoT), applied to the IIoT, wherein the IIoT includes a user platform, a service platform, a management platform, a sensor network platform, and an object platform connected in sequence, the sensor network platform includes a first general database and a plurality of sensor network sub-platforms, a sub-database is configured in each of the plurality of sensor network sub-platforms, respectively, the plurality of sensor network sub-platforms interact with the first general database, the management platform includes a second general database and a plurality of management sub-platforms, the second general database interacts with the plurality of sensor network sub-platforms and the plurality of management sub-platforms, the service platform includes a third general database, a plurality of sub-databases, and a plurality of service sub-platforms, the third general database interacts with the user platform, the third general database interacts with the second general database through the plurality of sub-databases, the plurality of sub-databases interact with one service sub-platform, respectively, and the data management method is performed by the management platform, comprising:

generating a data acquisition instruction and sending the data acquisition instruction to a data acquisition device and a monitoring device in the object platform, and transmitting and storing raw data acquired by the object platform to a first general database in the sensor network platform via the sensor network platform;

wherein the data acquisition instruction is configured to acquire the raw data in different production processes, and the data acquisition device and the monitoring device are respectively set on production equipment corresponding to the different production processes;

generating a first classification instruction based on a data type of the raw data and sending the first classification instruction to the first general database, the first classification instruction being configured to instruct the first general database to perform a first classification on the raw data to obtain a plurality of first data sets;

sending a first storage instruction to the first general database, the first storage instruction being configured to instruct the first general database to store the plurality of first data sets into the plurality of sub-databases configured in the sensor network platform, respectively, and transmitting and storing the plurality of first data sets to a second general database in the management platform via sensor network sub-platforms corresponding to the plurality of sub-databases, respectively, wherein storage capacities of different sub-databases are determined based on the different production processes;

generating a second classification instruction based on function types of a plurality of service sub-platforms in the service platform, the second classification instruction being configured to instruct the second general database to perform a second classification on the raw data in the plurality of first data sets to obtain a plurality of second data sets;

generating a second storage instruction based on a prioritization of the plurality of second data sets, the second storage instruction being configured to instruct the second general database to store the plurality of second data sets into the sub-databases corresponding to different service sub-platforms, and the sub-databases being used for the service sub-platforms to call the plurality of second data sets stored therein when the service platform receives a use request initiated by the user platform;

in response to existence of a data management demand, sending a data management instruction to the sub-databases corresponding to different service sub-platforms to realize data management, the data management including at least one of data processing order division, data verification, junk data cleaning; and in response to completion of the junk data cleaning, issuing an adjustment instruction to adjust a monitoring frequency of the monitoring device and/or an acquisition frequency of the data acquisition device.

2. The data management method of claim 1, after the raw data acquired by the object platform is transmitted and stored to the first general database via the sensor network platform, the method further comprises:

performing homological tagging on the raw data based on a degree of homology of the raw data, and obtaining at least one homologous data set;

instructing the first general database to perform the first classification on the raw data in each of the at least one homologous data set based on the first classification instruction to obtain the plurality of first data sets.

3. The data management method of claim 2, further comprising:

generating degrees of homology of different raw data based on a data source and a data type of the raw data.

4. The data management method of claim 2, wherein a type of homological tagging includes a primary homological tagging and a secondary homological tagging; the performing homological tagging on the raw data based on a degree of homology of the raw data further includes:

in response to determining that the degree of homology of the raw data is greater than a first threshold, performing the primary homological tagging of the raw data; and in response to determining that the degree of homology of the raw data is greater than a second threshold and less than the first threshold, performing the secondary homological tagging of the raw data.

5. The data management method of claim 1, further comprising:

performing a preliminary classification on the raw data based on a production batch and a production process of a product and the degree of homology of the raw data, to obtain a plurality of raw data sets, the plurality of raw data sets being stored in the first general database based on an order of the production batch and an order of the production process;

determining a prioritization of the plurality of raw data sets based on production defect data of a preset time period; and instructing the first general database to perform the first classification on the plurality of raw data sets based on the prioritization of the plurality of raw data sets to generate the plurality of first data sets.

6. The data management method of claim 5, wherein the determining a prioritization of the plurality of raw data sets includes:

determining whether each of the plurality of raw data sets include contamination data based on the production defect data, an acquisition parameter of the data acquisition device, the acquisition parameter being determined and updated by the management platform and sent to the corresponding data acquisition device; and determining the prioritization of the plurality of raw data sets based on a result of whether each of the plurality of raw data sets includes the contamination data.

7. The data management method of claim 6, wherein the determining the prioritization of the plurality of raw data sets based on a result of whether each of the plurality of raw data sets includes the contamination data includes:

determining the prioritization of the plurality of raw data sets through a priority evaluation model based on the data sources, the data types, and data generation time of the plurality of raw data sets, and the result of whether each of the plurality of raw data sets includes the contamination data, the priority evaluation model being a machine learning model.

8. The data management method of claim 6, wherein the priority evaluation model is obtained by training, and the training includes:

obtaining a plurality of training data sets and labels corresponding to the plurality of training data sets, and performing a plurality of iterations based on the plurality of training datasets and the labels corresponding to the plurality of training data sets; wherein at least one of the plurality of iterations includes:

selecting one or more training samples from the plurality of training data sets, and inputting the one or more training samples into an initial priority evaluation model to obtain model predicted outputs corresponding to the one or more training samples;

calculating a value of a loss function by substituting the model predicted outputs corresponding to the one or more training samples, and the labels corresponding to the plurality of training data sets into a formula of a predefined loss function;

inversely updating model parameters of the initial priority evaluation model based on the value of the loss function; and terminating the iteration when an iteration termination condition is satisfied to obtain a trained priority evaluation model.

9. The data management method of claim 1, further comprising:

presetting a plurality of pending data buckets in the first general database, the plurality of pending data buckets including at least one type of a contamination data bucket, a filing data bucket, a pending verification data bucket, and different pending data buckets being located on different storage devices;

classifying and tagging different raw data;

storing the raw data into at least one of the plurality of pending data buckets on different storage devices based on a result of classification and tagging; and generating the plurality of first data sets or the plurality of second data sets based on the plurality of pending data buckets.

10. The data management method of claim 9, wherein different pending data buckets have different allocation capacity, and an allocation capacity of the pending verification data bucket is determined based on the production defect data.

11. The data management method of claim 9, wherein the generating the plurality of first data sets or the plurality of second data sets based on the plurality of pending data buckets includes:

generating a data processing order corresponding to the plurality of pending data buckets based on the prioritization of the plurality of raw data sets, the plurality of pending data buckets preset in the first general database; and processing the raw data in the plurality of pending data buckets based on the data processing order.

12. The data management method of claim 2, wherein after the plurality of second data sets are stored into the sub-databases corresponding to different service sub-platforms based on the prioritization of the plurality of second data sets and data management is realized, the method further comprises:

in response to determining that the service platform receives a user use request initiated by the user platform, determining function types of the service sub-platforms to be called based on the user use request;

obtaining target service sub-platforms based on the function types of the service sub-platform to be called; and invoking sub-databases corresponding to the target service sub-platforms, and transmitting second data set stored in the sub-databases to the user platform via a third general database.

13. The data management method of claim 12, wherein before invoking sub-databases corresponding to the target service sub-platforms and transmitting second data sets stored in the sub-databases to the user platform via a third general database, the method further comprises:

determining whether the second data sets to be transmitted include homologous tagged data; and in response to determining that the second data sets to be transmitted include the homologous tagged data, transmitting homologous tagged data having the same homologous tags in the first general database to the sub-databases corresponding to the target service sub-platforms.

14. The data management method of claim 13, wherein the in response to determining that the second data sets to be transmitted include the homologous tagged data, transmitting homologous tagged data having the same homologous tags in the first general database to the sub-databases corresponding to the target service sub-platforms includes:

in response to determining that the second data sets to be transmitted include the homologous tagged data, obtaining the homologous tagged data having the same homologous tags in the first general database;

classifying and packaging the homologous tagged data based on types of the homologous tags of the homologous tagged data to obtain packaged data; and transmitting the packaged data to the sub-databases corresponding to the target service sub-platforms.

15. The data management method of claim 14, wherein the transmitting the packaged data to the sub-databases corresponding to the target service sub-platforms includes:

determining target sensor network sub-platforms based on a transmission resource occupation of the sensor network sub-platforms; and transmitting the packaged data to the sub-databases corresponding to the target service sub-platforms via the target sensor network sub-platforms.

16. The data management method of claim 1, wherein the prioritization of the plurality of second data sets is updated in real time, and the determining the prioritization of the plurality of second data sets includes:

determining the prioritization of the plurality of second data sets through a priority evaluation model based on data sources, data types, and data generation time of the plurality of second data sets, and a result of whether each of the plurality of second data sets includes contamination data, the priority evaluation model being a machine learning model.

17. The data management method of claim 16, wherein the generating a second storage instruction based on a prioritization of the plurality of second data sets, the second storage instruction being configured to instruct the second general database to store the plurality of second data sets into sub-databases corresponding to different service sub-platforms includes:

processing the plurality of second data sets in sequence according to the prioritization of the plurality of second data sets, and storing a plurality of processed second data sets into the sub-databases corresponding to different service sub-platforms, respectively, for data management; and in the process of the data management: when a pending second data set of a higher priority exists in the second general database, aborting, based on a preemptive scheduling algorithm, a current processing task of the second data set and assigning a processor to prioritize the processing of the pending second data set of the higher priority.

18. A data management device based on Industrial Internet of Things (IIoT), applied to the IIoT, wherein the IIoT includes a user platform, a service platform, a management platform, a sensor network platform, and an object platform connected in sequence, the sensor network platform includes a first general database and a plurality of sensor network sub-platforms, a sub-database is configured in each of the plurality of sensor network sub-platforms, respectively, the plurality of sensor network sub-platforms interact with the first general database, the management platform includes a second general database and a plurality of management sub-platforms, the second general database interacts with the plurality of sensor network sub-platforms and the plurality of management sub-platforms, the service platform includes a third general database, a plurality of sub-databases, and a plurality of service sub-platforms, the third general database interacts with the user platform, the third general database interacts with the second general database through the plurality of sub-databases, the plurality of sub-databases interact with one service sub-platform, respectively, and the data management device comprises:

a first storage module, configured to generate a data acquisition instruction and send the data acquisition instruction to a data acquisition device and a monitoring device in the object platform, and transmit and store raw data acquired by the object platform to a first general database in the sensor network platform via the sensor network platform; wherein the data acquisition instruction is configured to acquire the raw data in different production processes, and the data acquisition device and the monitoring device are respectively set on production equipment corresponding to the different production processes;

a first classification module, configured to generate a first classification instruction based on a data type of the raw data and send the first classification instruction to the first general database, the first classification instruction being configured to instruct the first general database to perform a first classification on the raw data to obtain a plurality of first data sets;

a second storage module, configured to send a first storage instruction to the first general database, the first storage instruction being configured to instruct the first general database to store the plurality of first data sets into the plurality of sub-databases configured in the sensor network platform, respectively, and transmit and store the plurality of first data sets to a second general database in the management platform via sensor network sub-platforms corresponding to the plurality of sub-databases, respectively, wherein storage capacities of different sub-databases are determined based on the different production processes;

a second classification module, configured to generate a second classification instruction based on function types of a plurality of service sub-platforms in the service platform, the second classification instruction being configured to instruct the second general database to perform a second classification on the raw data in the plurality of first data sets to obtain a plurality of second data sets;

a third storage module, configured to generate a second storage instruction based on a prioritization of the plurality of second data sets, the second storage instruction being configured to instruct the second general database to store the plurality of second data sets into the sub-databases corresponding to different service sub-platforms, and the sub-databases being used for the service sub-platforms to call the plurality of second data sets stored therein when the service platform receives a user use request initiated by the user platform;

a management module, configured to send, in response to existence of a data management demand, a data management instruction to the sub-databases corresponding to different service sub-platforms to realize data management, the data management including at least one of data processing order division, data verification, junk data cleaning; and an adjustment module, configured to issue, in response to completion of the junk data cleaning, an adjustment instruction to adjust a monitoring frequency of the monitoring device and/or an acquisition frequency of the data acquisition device.

19. An electronic device, comprising a processor and a storage device, wherein the storage device is configured to store computer programs; and the processor is configured to load and execute the computer programs to cause the electronic device to perform the data management method based on the IIoT as described in claim 1.

\* \* \* \* \*